(12) United States Patent
Zeng et al.

(10) Patent No.: US 11,617,941 B2
(45) Date of Patent: Apr. 4, 2023

(54) ENVIRONMENT INTERACTIVE SYSTEM PROVIDING AUGMENTED REALITY FOR IN-VEHICLE INFOTAINMENT AND ENTERTAINMENT

(71) Applicant: GM GLOBAL TECHNOLOGY OPERATIONS LLC, Detroit, MI (US)

(72) Inventors: Wei Zeng, Oakland Township, MI (US); Jeremie Dernotte, Rochester, MI (US); Ke Liu, Ypsilanti, MI (US); Nicole Ellison, Madison Heights, MI (US); Syed B. Mehdi, Southfield, MI (US); Kevin J. Silang, Sterling Heights, MI (US); Louis G. Hector, Jr., Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 17/008,758

(22) Filed: Sep. 1, 2020

(65) Prior Publication Data
US 2022/0062752 A1    Mar. 3, 2022

(51) Int. Cl.
| | |
|---|---|
| *A63F 13/213* | (2014.01) |
| *G06F 3/01* | (2006.01) |
| *G06V 20/59* | (2022.01) |
| *G06Q 30/0251* | (2023.01) |

(52) U.S. Cl.
CPC ............ *A63F 13/213* (2014.09); *G06F 3/013* (2013.01); *G06F 3/017* (2013.01); *G06V 20/59* (2022.01); *G06Q 30/0255* (2013.01)

(58) Field of Classification Search
CPC ........ A63F 13/213; G06F 3/013; G06F 3/017; G06K 9/00832
See application file for complete search history.

(56) References Cited

U.S. PATENT DOCUMENTS

| | | | |
|---|---|---|---|
| 8,686,922 B2* | 4/2014 | Breed | G01S 7/4802 701/1 |
| 2008/0158096 A1* | 7/2008 | Breed | G01S 15/88 340/436 |
| 2012/0169861 A1* | 7/2012 | Szczerba | G02B 27/01 348/78 |
| 2012/0295708 A1* | 11/2012 | Hernandez-Abrego | A63F 13/10 463/36 |
| 2013/0063340 A1* | 3/2013 | Mondragon | G09G 5/00 345/156 |

(Continued)

*Primary Examiner* — David L Lewis
*Assistant Examiner* — Shauna-Kay Hall

(57) ABSTRACT

An environment interactive system includes: a first camera capturing first images of an area external to the vehicle; a second camera capturing second images of an area interior to the vehicle; a telematics control module determining a geographical location of the vehicle; a viewing device displaying items adjacent to, on or in front of detected objects and in a FOV of an occupant. The items correspond to the detected objects; and an infotainment module. The infotainment module: detects the objects based on the first images and the location of the vehicle; based on the second images, tracks at least one of a location of an eye of the occupant or a location of a body part of the occupant other than the eye; and based on the location of the eye and the location of the body part, displays the items via the viewing device in the FOV.

20 Claims, 15 Drawing Sheets

(56) References Cited

U.S. PATENT DOCUMENTS

| | | | |
|---|---|---|---|
| 2013/0076615 A1* | 3/2013 | Iao | G01C 21/3664 |
| | | | 345/156 |
| 2013/0158778 A1* | 6/2013 | Tengler | G06V 40/28 |
| | | | 701/31.5 |
| 2014/0184550 A1* | 7/2014 | Hennessey | G06F 3/041 |
| | | | 345/173 |
| 2014/0236472 A1* | 8/2014 | Rosario | G08G 1/096741 |
| | | | 701/400 |
| 2015/0006278 A1* | 1/2015 | Di Censo | G06V 20/597 |
| | | | 705/14.43 |
| 2015/0062168 A1* | 3/2015 | Ng-Thow-Hing | |
| | | | G02B 27/0101 |
| | | | 345/633 |
| 2016/0216130 A1* | 7/2016 | Abramson | G01C 21/3423 |
| 2017/0136969 A1* | 5/2017 | Drescher | B60K 37/06 |
| 2017/0235360 A1* | 8/2017 | George-Svahn | G02B 27/017 |
| | | | 345/173 |
| 2017/0334357 A1* | 11/2017 | Lewis | G06T 11/60 |
| 2018/0265002 A1* | 9/2018 | Kawamoto | H04N 5/23238 |
| 2019/0318181 A1* | 10/2019 | Katz | B60W 40/09 |
| 2020/0073250 A1* | 3/2020 | Zi | G03F 7/70925 |
| 2020/0201349 A1* | 6/2020 | Ha | G08G 1/163 |
| 2020/0207358 A1* | 7/2020 | Katz | G06F 3/017 |
| 2021/0072831 A1* | 3/2021 | Edwards | G06F 3/013 |
| 2021/0331587 A1* | 10/2021 | Kim | B60K 35/00 |

* cited by examiner

ENVIRONMENT INTERACTIVE SYSTEM PROVIDING AUGMENTED REALITY FOR IN-VEHICLE INFOTAINMENT AND ENTERTAINMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to in-vehicle infotainment and entertainment.

Vehicles include one or more torque producing devices, such as an internal combustion engine and/or an electric motor, and are typically designed to be driven for extended periods of time. The vehicles can be non-autonomous or can be partially or fully autonomous. An occupant of a vehicle rides within a cabin (or passenger compartment) of the vehicle. Occupants within a vehicle can include a driver and one or more passengers. If the vehicle is fully autonomous, then all of the occupants may be referred to as passengers.

Vehicles may include sensors for sensing vehicle surroundings. As an example, a camera may be used to capture images of an environment outside of a vehicle. A vehicle may include forward facing, rear facing, and side facing cameras. Other example sensors for sensing vehicle surroundings include radar, sonar and light detection and ranging (LIDAR) sensors.

SUMMARY

An environment interactive system for a vehicle is provided. The environment interactive system includes: a first camera configured to capture first images of an area external to the vehicle; a second camera configured to capture second images of an area interior to the vehicle; a telematics control module configured to determine a geographical location of the vehicle; a viewing device configured to display items at least one of adjacent to, on or in front of detected objects and in a field of view of an occupant, where the items correspond to the detected objects; and an infotainment module. The infotainment module is configured to: detect the objects based on the first images and the location of the vehicle; based on the second images, track at least one of a location of an eye of the occupant or a location of a body part of the occupant other than the eye; and based on the location of the eye and the location of the body part, display the items via the viewing device in the field of view of the occupant.

In other features, the environment interactive system further includes a third camera configured to capture third images of the interior of the vehicle. The infotainment module is configured to, based on the second images and the third images, track the at least one of the location of the eye of the occupant or the body part of the occupant.

In other features, the body part is a finger of the occupant.

In other features, the infotainment module is configured to track an iris of the eye of the occupant, and based on the location of the iris and the location of the body part, display the items via the viewing device in the field of view of the occupant.

In other features, the infotainment module is configured to, based on at least one of the location of the eye or the location of the body part, display the items in front of the objects and in the field of view of the occupant.

In other features, the infotainment module is configured to: receive information and preferences of the occupant; and based on the information and preferences, display information about certain ones of the objects in the field of view of the occupant.

In other features, the infotainment module is configured to: receive information and preferences of the occupant; and based on the information and preferences, display targeted advertisements related to certain ones of the objects in the field of view of the occupant.

In other features, the infotainment module is configured to: receive information and preferences of the occupant; and based on the information and preferences, display targeted coupons related to certain ones of the objects in the field of view of the occupant.

In other features, the infotainment module is configured to: receive information and preferences of the occupant; display an item for the occupant to select corresponding to starting a game; and based on the location of the eye and the location of the body part, start the game.

In other features, the game includes displaying questions in the field of view of the occupant for the occupant to read and answer.

In other features, the infotainment module is configured to: determine if the vehicle has stopped at a recommended location of a business; and display in the field of view of the occupant a survey question for the occupant to answer pertaining to the business.

In other features, the infotainment module is configured to: detect when the occupant selects one of the objects by gesturing at the object; and display information pertaining to the selected object.

In other features, the infotainment module is configured to: display information on a head up display pertaining to one of the objects; and based on the at least one of the location of the eye or the location of the body part, detect when the occupant selects the one of the objects.

In other features, the infotainment module is configured to: interpret a gesture made by the occupant with regards to at least one of one of the objects or one of the items; and perform an action in response to the gesture.

In other features, the infotainment module is configured to interpret a gesture or voice response provided by the occupant to confirm whether eye tracking of a gaze point of the occupant is accurate.

In other features, an environment interactive method for an occupant of a vehicle is provided. The environment interactive method includes: capturing first images of an area external to the vehicle; capturing second images of an area interior to the vehicle; determining a geographical location of the vehicle; displaying items between detected objects and the occupant and in a field of view of the occupant, where the items correspond to the detected objects; detecting the objects based on the first images and the location of the vehicle; based on the second images, tracking a location of an eye of the occupant and a location of a body part of the occupant other than the eye; and based on the location of the eye and the location of the body part, displaying the items via the viewing device in the field of view of the occupant.

In other features, the method further includes: tracking an iris of the eye of the occupant; and based on the location of the iris and the location of the body part, displaying the items via the viewing device in the field of view of the occupant.

In other features, the method further includes, based on the location of the eye and the location of the body part, displaying the items in front of the objects and in the field of view of the occupant, on a screen, or on a head up display.

In other features, the method further includes: receiving information and preferences of the occupant; and based on the information and preferences, displaying information about certain ones of the objects in the field of view of the occupant, displaying targeted advertisements related to certain ones of the objects in the field of view of the occupant, and displaying targeted coupons related to certain ones of the objects in the field of view of the occupant.

In other features, the method further includes detecting when the occupant selects one of the objects by gesturing at the object; and displaying information pertaining to the selected object.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
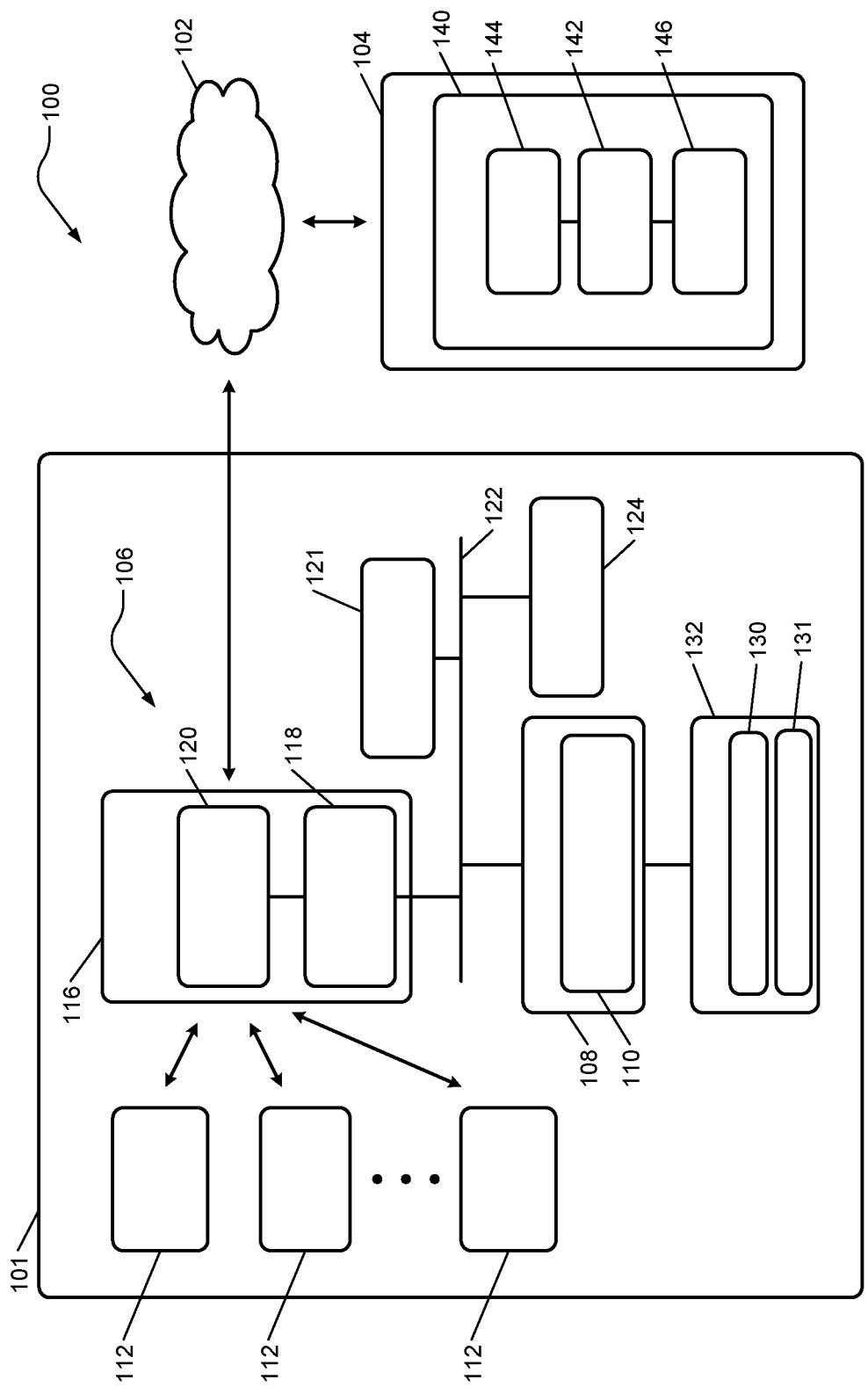
FIG. 1 is a functional block diagram of an example vehicle entertainment access system in accordance with the present disclosure.

A vehicle may include an infotainment system for providing entertainment within a vehicle to entertain occupants of the vehicle. The infotainment system may include a center console display, one or more displays for rear seat passengers, and an audio system. Although these displays and audio system can provide some entertainment, such as playing music and/or videos, passengers when traveling for extended periods of time can become bored. This may occur while the vehicle is cruising, while the vehicle is in a congested area, when the vehicle is stopped and recharging, and/or during other conditions.

The examples set forth herein are directed to providing in-vehicle entertainment and include environment interactive systems allowing occupants to interact with a view of an environment. The interaction is with viewed objects and displayed items, such as icons, advertisements, text messages, website pages, applications, and/or other items, which may be displayed in the view of the environment and/or in images of the environment. The items may be displayed on a windshield, on a head up display (HUD), on a screen in the vehicle, on a portable network device, on a side window, or elsewhere in the vehicle. As used herein a portable network device (or simply "network device") may be a cellular phone, a laptop computer, a tablet, a wearable device, a display, etc.

The environment interactive systems are network connected, occupant connected, interactive, instructive, personalized and entertaining and applicable to different levels of autonomous vehicles, autonomous public transportation (e.g. a robotaxi), shared vehicles, public vehicles, and other vehicles. Occupant connectivity refers to the obtaining of personal information of occupants and performing operations based on the personal information and a surrounding environment and may include providing advertisements customized for occupant interests. Interactivity refers to the ability of an occupant to interact with the environment interactive systems and the surrounding environment as seen in a field of view of the occupant by providing gestures (e.g., hand pointing, eye blinking, etc.). The field of view refers to an area of an environment external to a vehicle of an occupant and forward or to the side of the occupant, such as the field of view through a windshield or side window of the vehicle. The environment interactive systems detect the gestures and/or contact with touchscreens. The environment interactive systems can be a better display platform than a smartphone.

The environment interactive systems are able to operate as tour guides, shopping assistants, and marketing tools to provide targeted advertisements and coupons. Information and advertisements are provided based on personal interests of the occupants. Relevant coupons based on occupant preferences are provided and may be transferred to portable network devices for immediate use. Occupant selected information including object information, advertisements and coupons may be saved to the portable network device of the occupant. Occupants can interact with the environment interactive systems using gestures by, for example, pointing at displayed items and/or objects in a field of view of the occupant. This may include hand movements, referred to as a hand gesture, to signify tapping on the displayed items and/or objects in the field of view. Occupants may also interact via touchscreens and/or other traditional user input devices. By providing the stated entertainment, vehicle occupants remain active in a vehicle and spend less time utilizing cellular phones. This can minimize the probability of an occupant getting motion sickness in a fully autonomous vehicle.

The environment interactive systems provide a unique visual experience to occupants including a connection to the real world via a shopping assistant and instructive information of current surroundings of a vehicle. Occupants are provided with a new shopping experience including seamless personalized advertisements and real time marketing based on a surrounding environment, which brings occupants back to products. Costs of using autonomous vehicles and autonomous rides are able to be reduced via ride sharing and use of the vehicles for advertising products and services.

By being instructive, the environment interactive systems provide to vehicle occupants information relative to a current environment external to a vehicle. The environment interactive systems provide entertainment to vehicle occupants while commuting in a vehicle without use of a smart phone. The environment interactive systems are able to play games, such as trivia games. The games may be played by multiple occupants within a same vehicle or within different vehicles using vehicle-to-vehicle (V-to-V) communication.

A real time mapping system is disclosed and combines an in-vehicle stereo vision system including cameras, perception control, gesture interpretation, eye tracking, finger (or body part) tracking, geographical location tracking, object tracking and identification, etc. The real time mapping system allows an occupant of a vehicle to "click" on targets (e.g., buildings surrounding the vehicle) outside of interest using a gesture. The occupant may directly click on real targets of interest, which are located outside the vehicle, for example, by pointing and/or waving a finger towards the targets. Position and/or movement of one or more eyes and/or fingers are monitored and tracked and gesture interpretation is implemented to determine the target being selected. This is implemented while the occupant is in the vehicle, which may be stopped or moving. Information is displayed for selection by the occupant on a HUD and/or via some other imaging device and/or system. The information may be displayed adjacent to or on detected objects, such as in front of objects (i.e. between the occupants and the objects and in the field of view of the occupant). The phrase "adjacent to" in this context means near and to the side of the object and in the field of view of the occupant. Items that are displayed on objects may be displayed in front of or overlaid on the objects so as to be viewed on a front surface of the objects. Items may be displayed for an object in other areas of the field of view and/or on other displays. Once a selection is made, additional information including a next level of detail may be displayed and this process may be continued. This real time mapping system connects occupants to the real world surrounding the vehicle with an ergonomically advantageous interaction experience. The examples aid in eliminating cell phone dependence and distracted driving.

FIG. 1 shows a vehicle entertainment access system 100 that includes a vehicle 101, a distributed communications system 102, and a central office 104 of a service provider. The vehicle 101 includes an environment interactive system (referred to also as a real time mapping system), a portion of which is shown and designated 106. The environment interactive system includes an infotainment module 108 that executes an environment interactive application 110. The infotainment module 108 communicates with network devices 112 and a central office 104 via a telematics module 116. The network devices 112 may be implemented as displays, portable network devices, and/or other network devices. The displays (or viewing devices) may include HUDs, laser holographic devices, liquid crystal displays (LCDs), and/or other 2D and 3D displays. A windshield and/or window may be used to display items and as such may be referred to as a display. The telematics module 116 includes a telematics control module 118 and transceivers 120, which may include Bluetooth® transceivers, wireless local area network (WLAN) transceivers, wireless fidelity (Wi-Fi®) transceivers, cellular and/or other transceivers. The infotainment module 108 is connected to the telematics module 116, a vehicle control module 121, and other modules 124 via a bus 122 (e.g., a controller area network (CAN) bus). The infotainment module 108 stores occupant information 130 and preferences 131 in a memory 132. Examples of occupant information and preferences are disclosed below. As used herein the term "occupant" may be replaced with the term "user". As further disclosed herein, the infotainment module 108 sends items to the network devices 112 for display based on the occupant information and preferences.

The infotainment module 108 communicates with a monitoring station 140 of the central office 104 via the distributed communications system 102. The monitoring station 140 may include a control module 142, a transceiver 144 and a database and/or memory 146. Occupant information and preferences may be stored in the database and/or memory 146 and shared with the infotainment module 108. The monitoring station may operate as, include and/or have access to cloud-based storage. The infotainment module 108 may access the Internet and provide Internet connectivity for downloading advertisements and educational information via the distributed communication system 102. In one embodiment, the environment interactive application is implemented as part of a vehicle communication interface module (e.g., an OnStar® module) and the monitoring station 140 provides remote services associated with the vehicle communication interface module. The vehicle communication interface module may be one of the other modules 124. Occupant information and information pertaining to objects and corresponding items may be obtained through an internet connection or backend services provided within the vehicle 101 as further described below. The backend services may be at least partially provided by the monitoring station 140 and/or other remote network device.

Figure 2:
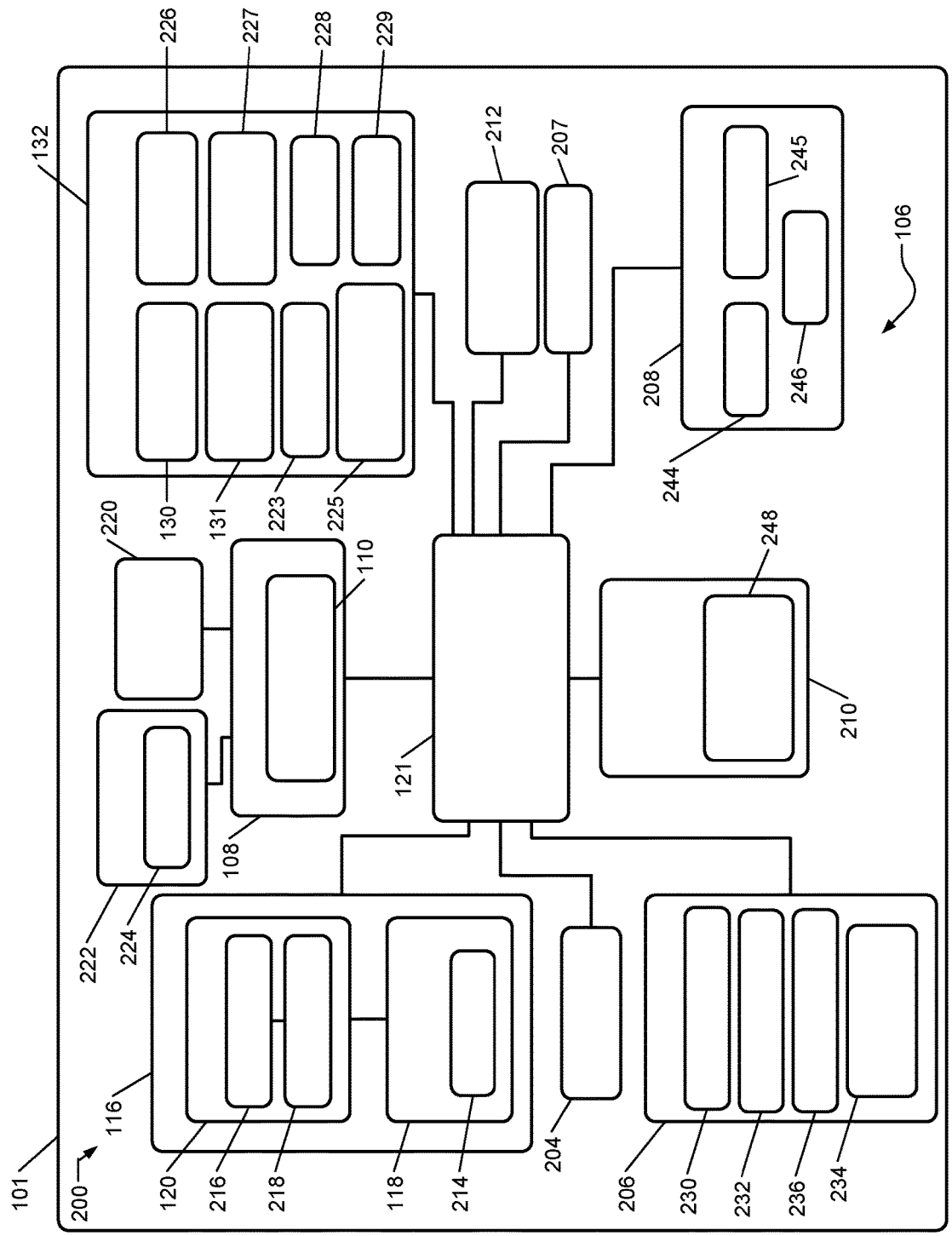
FIG. 2 is a functional block diagram of a vehicle incorporating an example vehicle system including an example environment interactive system in accordance with the present disclosure.

FIG. 2 shows the vehicle 101 incorporating a vehicle system 200 including the environment interactive system 106. The vehicle 101 includes the infotainment module 108 including the environment interactive application 110, the telematics module 116, the vehicle control module 121, the memory 132, a navigation module 204, sensors 206, microphones 207, a propulsion system 208, an inertial measurement module 210, and other vehicle systems 212.

The telematics module 116 provides wireless communication services within the vehicle 101 and wirelessly communicates with service providers. The telematics module 116 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 116 may include the telematics control module 118 and a transceiver 120. The telematics control module 118 may include a global positioning system (GPS) 214. The transceiver 120 includes a physical layer (PHY) module 216 and a medium access control (MAC) module 218. The PHY module 216 wirelessly communicates with network devices internal and external to the vehicle 101. The MAC module 218 may perform pattern recognition, channel addressing, channel access control, and filtering operations.

The infotainment module 108 may include and/or be connected to an audio system 220 and/or a video system 222 including one or more displays (one display 224 is shown in FIG. 2) to provide vehicle status information, diagnostic information, prognostic information, entertainment features, and other vehicle and non-vehicle related information. The entertainment features may include: object information; business information; environment information, advertisements; coupons; game associated information, data and/or questions; and/or other entertainment data. The infotainment module 108 may also provide entertainment features, such as allowing an occupant (or passenger) to play games within the vehicle, outputting (visibly and/or audibly) local information to the passenger, providing advertisements to the occupant, providing coupons to the passenger and/or other entertaining features disclosed herein. These features are provided to improve an occupant experience within the vehicle. The displays may also display (i) items captured by the external cameras 230 including objects detected that are external to the vehicle, and (ii) information associated with the detected objects.

The vehicle control module 121 may control operation of the vehicle 101 including operation of the propulsion system 208 and other vehicle systems 212. The memory 132 may store the occupant information 130, the occupant preferences 131, entertainment information 223, Internet based information 225, object information 226, business information 227, map data 228, and other data 229. The occupant (or personal) information 130 may include, for example, occupant names, occupant identifiers (IDs), occupant passwords, facial recognition information, fingerprint recognition data, eye recognition data, and other personal information. The object information 226 and the business information 227 may include names of the objects and businesses, addresses of the businesses, ages of the objects and businesses, histories of the objects and businesses, etc. The occupant preferences 131 may include personal applications, preferred podcasts, music preferences, types of information searched, online videos watched, social media information, preferred restaurants and/or bars, hobbies, work related information, vacation locations, items searched and/or purchased, preferred hotels, preferred airlines, preferred methods of traveling, etc. Restaurant related information may include types of food preferred, coffee shops preferred, rating and cost preferences, etc. The personal information 130 and/or occupant preferences 131 may include information related to online sources, such as Audible®, Spotify®, Pandora®, YouTube®, etc. The personal information 130 and/or occupant preferences 131 may include information related to social media, such as Facebook®, Instagram®, Snapshot®, etc. The personal information 130 and/or occupant preferences 131 may include information related to search engines and/or shopping sources, such as Google®, Yelp®, Amazon®, etc.

The entertainment information 223 may include some of the occupant preferences, games and/or trivia information and/or questions related to a local environment surrounding the vehicle 101, local events, popular "things to see" in a local area, the Internet based information 225, the object information 226, the business information 227, etc. The internet based information 225 may include information related to websites, products, services, videos, restaurants, and/or other items searched and/or viewed via the Internet.

The object information 226 may include fauna and/or flora information, architectural information, historical information, landmark information, building information, etc. The business information 227 may include historical information, information describing the business, building information, architectural information, stock information, company status information, etc. The map data 228 may include geographical data, location identification information, and local weather. The other data 229 may include traffic information, time of day information, etc.

The navigation module 204 executes a navigation application to provide navigation services. As an example, if the vehicle 101 is an autonomous vehicle, the navigation module 204 may direct the vehicle control module 121 to a certain location.

The sensors 206 may include external cameras 230, internal cameras 232, and other vehicle sensors 234 (e.g., a vehicle speed sensor). The cameras 230, 232 may be 2-dimensional cameras, 3-dimensional cameras, depth cameras, infrared cameras, visible light cameras, and/or other suitable cameras. The external cameras 230 and the telematics control module may be used to detect objects external to the vehicle 101. The cameras 230, 232 may include corresponding infrared (IR) sources 236. IR sources may be used on an exterior of a vehicle, when for example there is low visibility (visibility distance is low), such as on a foggy day. In one embodiment, visible light cameras and IR cameras are used. The external cameras 230 are used to monitor areas surrounding the vehicle and may be in various locations on the vehicle. The internal cameras 232 are used to monitor positions of occupant eyes, monitor finger positions of occupants, and/or determine gaze points of occupants. The positions of the occupant eyes refer to physical locations within the vehicle 101. A gaze point refers to a direction in which eyes of an occupant are looking and an environment location the occupant is looking at. The microphones 207 may be used to receive audio commands from occupants.

The propulsion system 208 may include an internal combustion engine 244, a transmission 245, and/or one or more electric motors 246 to propel the vehicle 101. The vehicle control module 121 may control the propulsion system 208 to cause the vehicle 101 to move to selected locations.

The inertial measurement module 210 includes inertial measurement sensors 248, such as accelerometers and/or rate sensors. The inertial measurement module 210, as an example, may be located at or near a center of gravity (cg) point of a vehicle. The inertial measurement sensors 248 may be used to measure longitudinal and lateral accelerations and/or longitudinal and lateral velocity of the vehicle 101. The longitudinal and lateral accelerations and the longitudinal and lateral velocity may be integrated to determine pitch angles and roll angles of the vehicle 101 to determine orientation of the vehicle.

Figure 3:
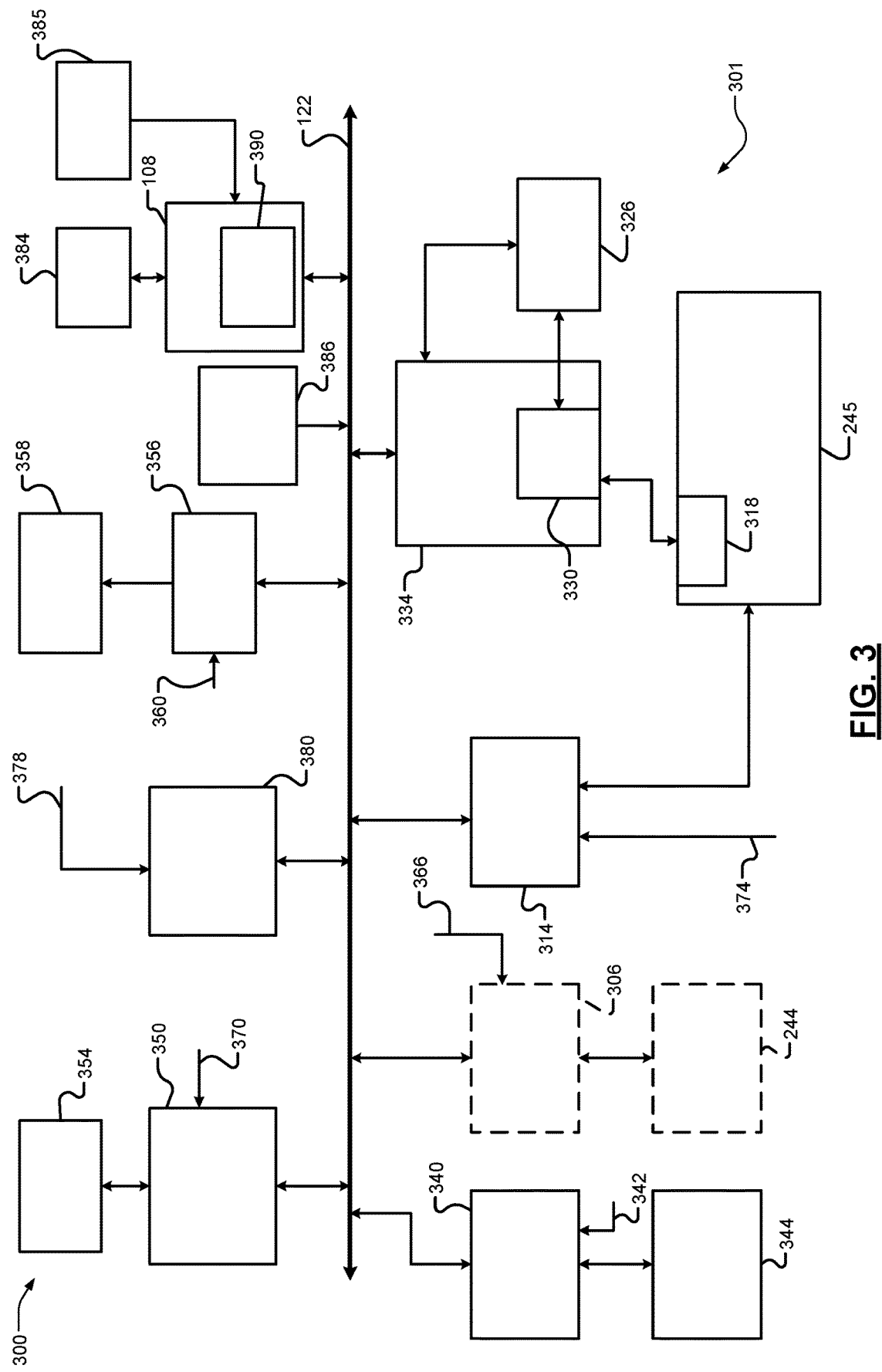
FIG. 3 is a functional block diagram of a portion of the vehicle system and a portion of the environment interactive system of FIG. 2.

FIG. 3 shows a portion 300 of the vehicle system 200 of FIG. 2 and a portion 301 of the environment interactive system 106 of FIG. 2. Although vehicle system 200 of FIG. 2 is shown as a hybrid vehicle system in FIGS. 2-3, the present disclosure is also applicable to non-hybrid vehicles, electric vehicles, fuel cell vehicles, and other types of vehicles including autonomous vehicles, semi-autonomous vehicles, non-autonomous vehicles, shared vehicles, non-shared vehicles, and other types of vehicles.

The vehicle system 200 includes the engine 244, which may combust an air/fuel mixture to generate drive torque. An engine control module (ECM) 306 controls the engine 244. In one embodiment, the vehicle system 200 is a fully electric vehicle and the ECM 306 and the engine 244 are not included. For example, the ECM 306 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 244 may be omitted.

The engine 244 may output torque to the transmission 245. A transmission control module (TCM) 314 controls operation of the transmission 245. For example, the TCM 314 may control gear selection within the transmission 245 and one or more torque transfer devices (e.g., a torque converter, one or more clutches, etc.).

The vehicle system 200 may include the one or more electric motors 246 shown in FIG. 2, such as the motor 318. For example, an electric motor 318 may be implemented within the transmission 245 as shown. The electric motor 318 may perform as either a generator or as a motor. When operating as a generator, the electric motor 318 converts mechanical energy to electrical energy. The electrical energy may be, for example, used to charge a battery 326 via a power control device (PCD) 330. When operating as a motor, the electric motor 318 generates torque that is used, for example, to supplement or replace torque output by the engine 244. The vehicle may include zero or more electric motors.

A power inverter module (PIM) 334 may control the electric motor 318 and the PCD 330. The PCD 330 applies power from the battery 326 to the electric motor 318 based on signals from the PIM 334, and the PCD 330 provides power output by the electric motor 318, for example, to the battery 326. The PIM 334 may include, for example, an inverter.

A steering control module 340 controls steering/turning of wheels of the vehicle, for example, based on driver turning of a steering wheel within the vehicle and/or steering commands from one or more vehicle control modules. A steering wheel angle (SWA) sensor monitors rotational position of the steering wheel and generates a SWA signal 342 based on the position of the steering wheel. As an example, the steering control module 340 may control vehicle steering via an electronic power steering (EPS) motor 344 based on the SWA signal 342. However, the vehicle 101 may include another type of steering system.

An electronic brake control module (EBCM) 350 may selectively control brakes 354 of the vehicle. A horn module 356 may apply power to a horn 358 when a horn input 360 is in a first state. The horn 358 outputs sound when power is applied to the horn 358. The horn module 356 may not apply power to the horn 358 when the horn input 360 is in a second state. The horn input 360 may transition from the second state to the first state, for example, in response to occupant application of at least a predetermined force is applied to a horn input device (e.g., located on the steering wheel). The horn input device may apply a bias force such that the horn input 360 is in the second state when less than the predetermined force is applied to the horn input device.

Modules of the vehicle may share parameters via the bus 122, which may include one or more data buses. Various parameters and data may be made available by a given module to other modules via the bus 122.

Some example driver inputs include, for example, an accelerator pedal position (APP) 366, which may be provided to the ECM 306. A brake pedal position (BPP) 370 may be provided to the EBCM 350. A position 374 of a park, reverse, neutral, drive lever (PRNDL) may be provided to the TCM 314. An ignition state 378 may be provided to a body control module (BCM) 380. For example, the ignition state 378 may be input by a driver via an ignition key, button, or switch. At a given time, the ignition state 378 may be one of off, accessory, run, or crank.

The infotainment module 108 selectively provides object information, entertainment information, and other information via one or more output devices 384. The infotainment module 108 also selectively executes games and outputs trivia questions and gaming feedback via the one or more output devices 384. The output devices 384 may include, for example, any of the displays referred to herein, one or more sets of virtual reality (VR) goggles, one or more sets of augmented reality (AR) goggles, one or more other suitable types of video output devices, one or more speakers, one or more haptic devices, and/or one or more other suitable types of output devices. The infotainment module 108 outputs gaming video via the one or more displays, one or more sets of VR goggles, and/or one or more sets of AR goggles. The infotainment module 108 outputs gaming audio via the one or more speakers. The infotainment module 108 may also output other gaming feedback via one or more haptic devices. For example, haptic devices may be included with one or more seats, in the steering wheel, etc.

Examples of displays may include, for example, one or more displays (e.g., on a front console) of the vehicle, one or more displays of portable network devices, a HUD that displays information via a substrate (e.g., windshield), one or more displays that drop downwardly or extend upwardly to form panoramic views, and/or one or more other suitable displays. In various implementations, one or more HUDs may project onto the windshield to use the windshield as a panoramic augmented reality (AR) display.

The infotainment module 108 controls play of one or more games based on occupant input received via one or more input devices 385, such as one or more of the displays referred to herein, center console input devices (e.g., switches, knobs, etc.), gaming controllers, one or more joysticks, etc. Under some circumstances, such as when the vehicle is parked, the infotainment module 108 may control gameplay based on input from vehicle components (e.g., the steering wheel, brake and accelerator pedals, horn, etc.). The infotainment module 108 may additionally or alternatively audibly and/or visibly output other information, such as personalized advertisements, coupons, information about points of interest in front of the vehicle, etc.

The infotainment module 108 may provide the stated outputs based on inputs from external and internal sensors 386, such as external and internal cameras. For example, the infotainment module 108 may display text messages, text alerts, icons, objects and/or other items on a display via input from the external and internal sensors 386 while occupants are in the vehicle 101.

As another example, based on input from the external sensors, an object detection module 390 may detect, identify and determine information pertaining to objects around the vehicle 101 and locations of the objects relative to the vehicle 101. The infotainment module 108 may include the object detection module 390 and adjusts items displayed based on the determined object information.

Figure 4:
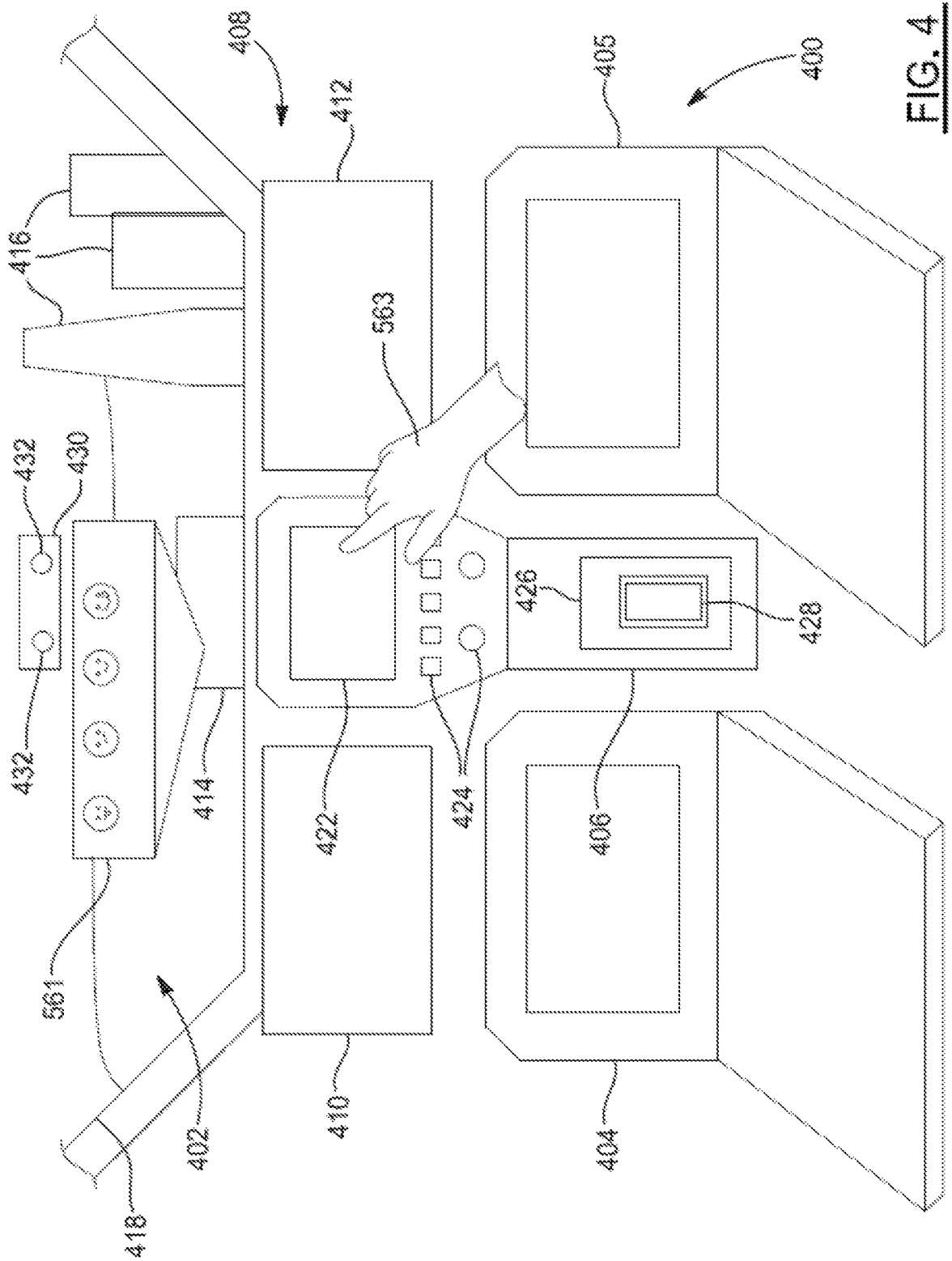
FIG. 4 is a perspective view of an interior of a vehicle and a portion of an environment forward of the vehicle implementing the environment interactive system in accordance with the present disclosure.

FIG. 4 shows an interior 400 of the vehicle 101 of FIGS. 1-2 and a portion 402 of an environment forward of the vehicle 101 implementing the environment interactive system 106 of FIG. 2. The interior 400 includes seats 404, a center console 406, a dashboard 408 including displays 410, 412, and a HUD 414. The environment includes buildings 416, which are visible in a field of view of occupants in the seats 404, 405 through a windshield 418. The center console 406 includes a display 422, interface switches and knobs 424, and a charging station 426. A portable network device 428 may be set on the charging station 426 and be charged. The portable network device 428 may wirelessly communicate with the infotainment module 108 of FIGS. 1-3 via, for example, a Bluetooth connection or other suitable wireless connection. The portable network device 428 may include an interactive application for communicating with the infotainment module 108 of the vehicle 101 during an environment interactive mode. During the environment interactive mode, occupants may interact with an environment and/or items displayed by looking at the objects in the environment and/or the displayed items, pointing at the objects and/or items, and gesturing. To gesture an object and/or item, an occupant may point at the object and/or item, move a finger of the occupant as to "tap" on the object and/or item, touch one of the touchscreens, etc. Gesturing is further described below.

The infotainment module 108 may display items on the windshield 402, over the buildings 416 and/or in other areas of the windshield, on the HUD 414, on the displays 410, 412 and/or on the display 422, as described herein. The items displayed may be personalized for either two occupants sitting respectively in the seats 404, 405. As an example, GPS and compass related information including maps, heading directions, etc. may be displayed on the display 422. The displays 410, 412 may be deployable (i.e. movable) up to and away from the laps of occupants in the seats 404, 405.

A sensor module 430 may be included and attached to the top of the windshield and/or to a ceiling of the vehicle 101. The sensor module 430 may include internal cameras 432. The sensor module 430 may include IR sources, such as the IR sources 236 shown in FIG. 2. The sensor module 430 may include any number of cameras and IR sources for each occupant and a corresponding one of the seats 404, 405 of that occupant. One or more cameras and IR sources may be directed to an occupant in seat 404 and another one or more cameras and IR sources may be directed to an occupant in seat 405. The internal cameras 432 are used to monitor positions of occupant eyes, position and movement of occupant fingers and/or hands, and/or gaze points of the occupants. The interior 400 may include an audio system and wireless transceivers for transmitting signals to and receiving signals from the portable network device 428.

The above-described external and internal cameras are positioned to capture images and video outside of (external to) the vehicle and inside and internal to the vehicle. External forward facing cameras capture images and video of images within a predetermined field of view (FOV) in front of the vehicle. A right side mounted camera may be used to capture images and video within a predetermined FOV to the right of the vehicle. A left side mounted camera captures images and video within a predetermined FOV to the left of the vehicle. The external sensors may additionally or alternatively include various other types of sensors, such as ultrasonic sensors, radar sensors, LIDAR sensors, etc. The external sensors may be used to detect distances between the vehicle and objects, positions of objects relative to the vehicle, etc.

The systems disclosed herein may be operated using numerous methods, example methods are illustrated in FIGS. 5 and 8-11. Although the following methods are shown as separate methods, one or more of the methods and/or operations from separate methods may be combined and performed as a single method. Although the following operations of FIGS. 5 and 8-11 are primarily described with respect to the implementations of FIGS. 1-4, the operations may be easily modified to apply to other implementations of the present disclosure. The operations may be iteratively performed. The operations may be performed by the environment interactive system 106 of FIG. 2.

Figure 5A:
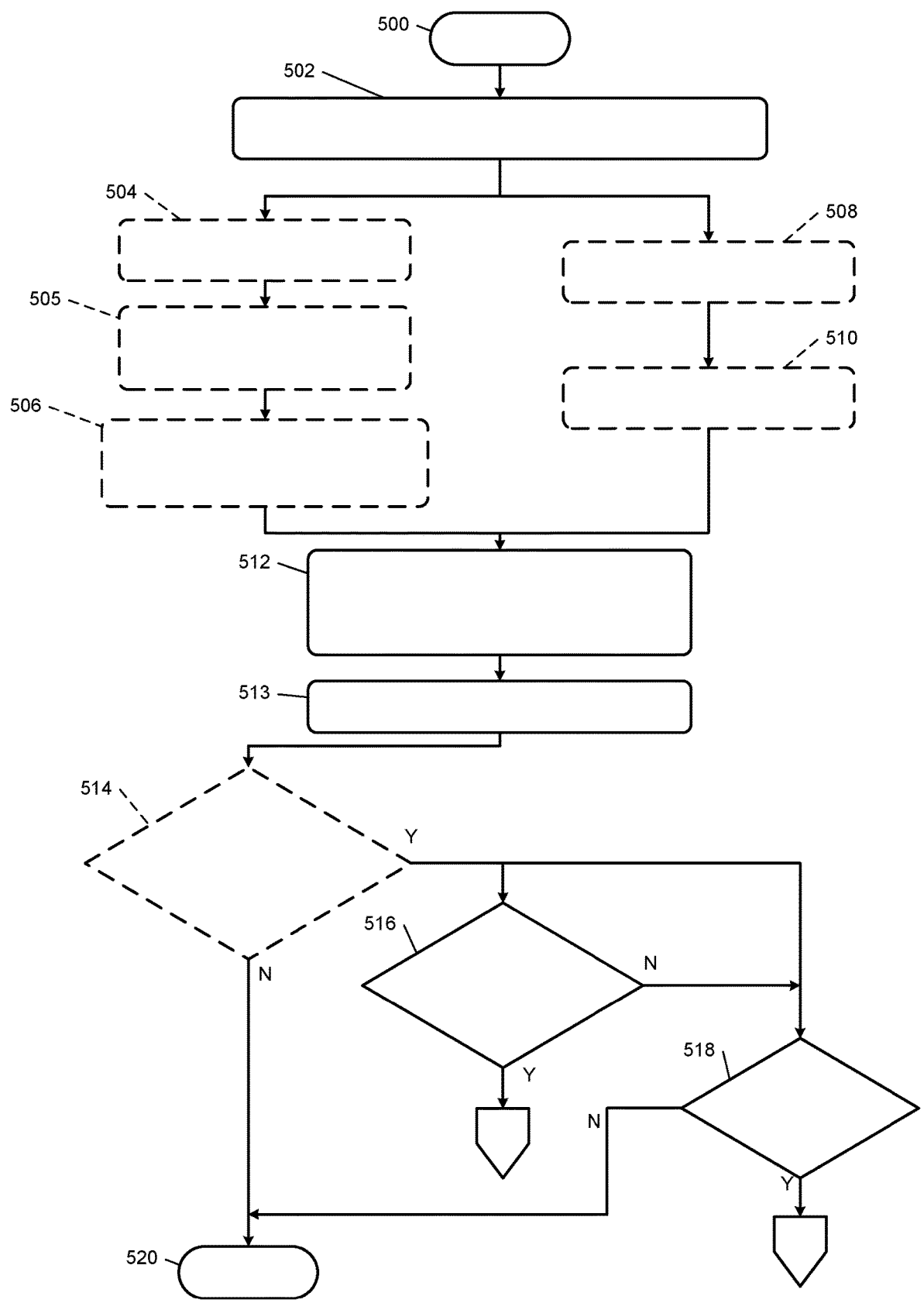
FIGS. 5A-C illustrates an entertainment interactive method in accordance with the present disclosure.
Figure 5B:
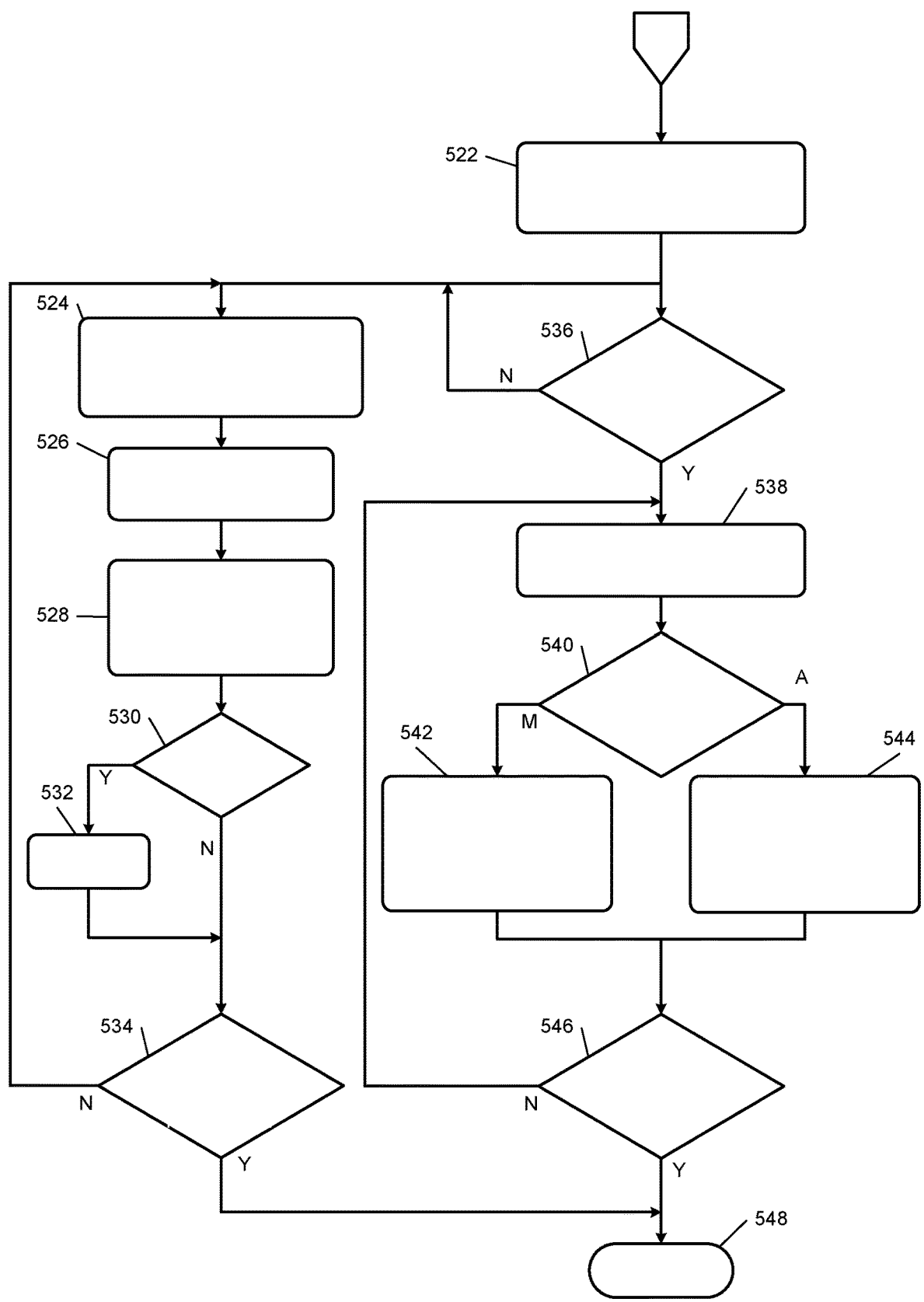
Figure 5C:
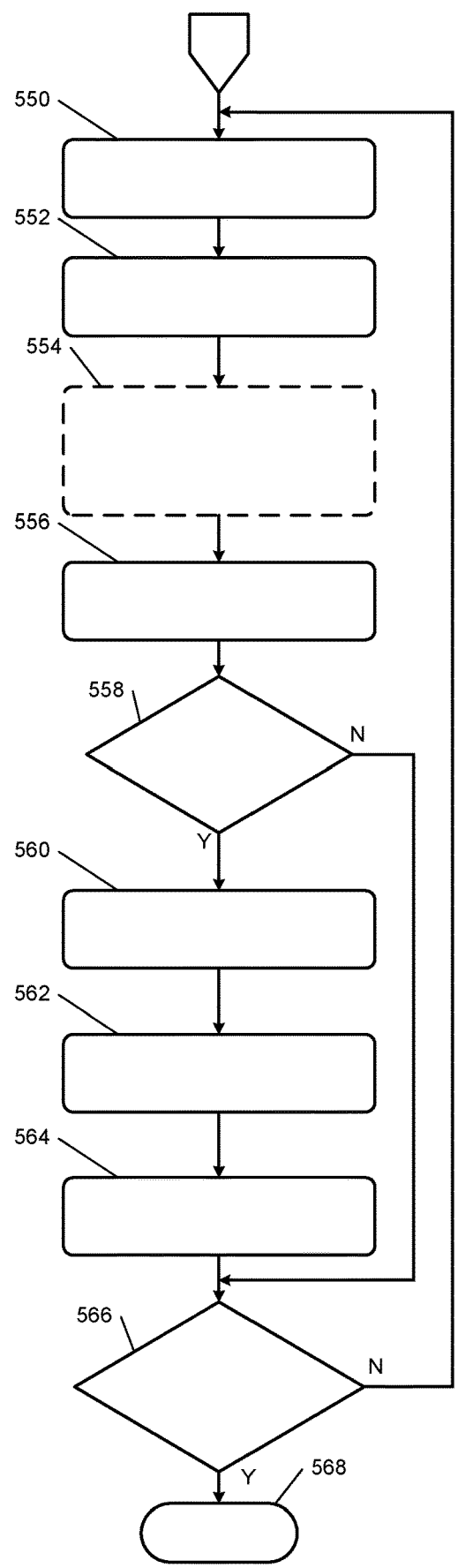

FIGS. 5A-C illustrate an entertainment interactive method. FIGS. 5A-C are collectively referred to as FIG. 5. The method may begin at 500. At 502, the infotainment module 108 via the external sensors and/or cameras, the internal sensors and/or cameras, and/or other sensors detects (i) a network device (e.g., a portable network device) that is near, approaching and/or moved into the vehicle 101, and/or presence of an occupant in the vehicle 101. The occupant may have moved into the interior cabin of the vehicle 101.

At 504, the infotainment module 108 via the telematics module 116 may establish a connection with the network device if a connection has not already been established. This may include performing a handshake process.

At 505, the infotainment module 108 performs a recognition process to recognize the network device and/or occupant. This operation may be triggered by the network device being moved into the vehicle. For example, a computing device (e.g., cell phone) may wirelessly connect with the vehicle, such as via an application executing on the computing device. The wireless connection may be, for example, using a Bluetooth transceiver, a WiFi transceiver, or another suitable type of wireless transceiver. The infotainment module 108 may recognize the occupant based on a unique identifier of the computing device. Additionally or alternatively, another type of recognition may be used. For example, the infotainment module 108 may recognize the occupant via biometric recognition, such as facial recognition, fingerprint recognition, speech recognition, etc.

At 506, personal information and/or preferences pertaining to the occupant are (i) uploaded from the network device to the infotainment module 108, (ii) downloaded from the monitoring station 140 to the infotainment module 108, and/or (iii) downloaded from another cloud-based server, database and/or memory to the infotainment module 108. Operation 506 may be performed after the network device and/or the occupant is recognized by the infotainment module 108. This recognition is further described below with respect to one or more of the methods of FIGS. 8-11.

At 508, the infotainment module 108 may perform a recognition process to recognize the occupant. This operation may be triggered by the occupant moving into the interior of the vehicle 101. This recognition process may be similar to the above-described recognition process and be based on, for example, facial, fingerprint, eye, speech and/or other personal recognition.

At 510, the infotainment module 108 accesses the personal information and/or preferences. This may include the downloading of the personal information and/or preferences as described above.

At 512, sensor data is generated. This may include GPS data, compass data, camera data, vehicle orientation data, vehicle position data, and/or other vehicle data. The external and internal cameras may capture images of an environment around the vehicle 101 and of the occupants. The images of the occupants may be of the occupant's eyes and surrounding areas for later determination of eye positions, finger and/or hand positions, and/or gaze points.

At 513, the infotainment module 108 determines the location and orientation of the vehicle 101. The infotainment module 108 obtains the present location of the vehicle, such as from the GPS 214. The infotainment module 108 may also obtain a heading and/or orientation of the vehicle 101, such as from the GPS 214, a compass of the vehicle 101, the inertial measurement module 210, and/or images from the external sensors and/or cameras.

At 514, the infotainment module 108 determines whether an input has been received from the occupant via, for example, the corresponding network device to initiate the environment interactive mode. If an input has been received, operations 516 and/or 518 may be performed, otherwise the method may end at 520 in which case no entertainment (no visible or audible output) may be provided. In one embodiment, the environment interactive mode is automatically enabled when the occupant is present in the vehicle.

At 516, the infotainment module 108 determines whether an input has been received from the occupant via, for example, the corresponding network device to initiate the entertainment mode. If an input has been received, the entertainment mode is activated and operation 522 of FIG. 5B may be performed, otherwise operation 518 may be performed. The infotainment module 108 may activate the entertainment mode automatically (e.g., in response to the recognition of the passenger) or in response to receipt of occupant input (e.g., via a button, switch, etc.) to activate the entertainment mode.

At 518, the infotainment module 108 determines whether an input has been received from the occupant via, for example, the corresponding network device to initiate the targeted marketing mode. If an input has been received, the targeted marketing mode is activated and operation 550 of FIG. 5C may be performed, otherwise the method may end at 520. The infotainment module 108 may activate the entertainment mode automatically (e.g., in response to the recognition of the passenger) or in response to receipt of occupant input (e.g., via a button, switch, etc.) to activate the entertainment mode.

At 522, an input may be received from the occupant via the corresponding network device selecting the one or more types of entertainment to be enabled. The infotainment module 108 may provide one or more types of entertainment, such as executing a game (e.g., a trivia game) at 538 or outputting (e.g., visibly and/or audibly) local information at 524. The type of entertainment may be selected by the occupant and/or determined by the infotainment module, for example, based on the occupant information and personal preferences. Operations 524 and/or 536 may be performed subsequent to operation 522.

Figure 6:
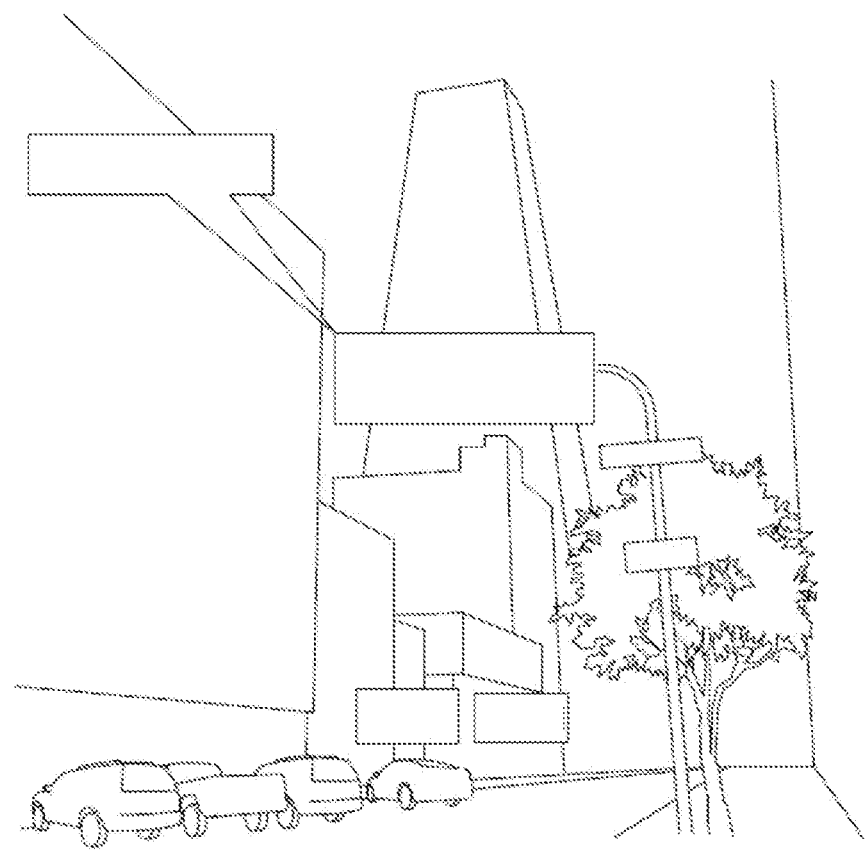
FIG. 6 is an example view illustrating display of interactive items in front of objects in a field of view of an occupant in accordance with the present disclosure.

At 524, the infotainment module 108 obtains local information and displays environment based interactive entertaining information on one or more displays, windshield, window, etc., as described above. The local information may be obtained wirelessly from one or more remote sources (e.g., one or more websites, such as Wikipedia, one or more databases, etc.), the monitoring station 140, and/or from the memory 132 of the vehicle. For example, the infotainment module 108 may display local information of objects and/or for businesses that are presently visible in front of the vehicle. The infotainment module 108 may, for example, project information associated with a business or point of interest onto the windshield or into the virtual environment at the location of the business or point of interest. FIG. 6 includes an example illustration of information displayed in association with buildings, businesses (local stores, restaurants, etc.) and points of interest. The information may be displayed based on interests of the occupant, which may be indicated and/or determined based on the occupant information and preferences.

In one embodiment, the infotainment module 108 operates as a tour guide displaying information and/or generating corresponding audio messages. In another embodiment, the infotainment module 108 operates as a shopping assistant and indicates stores that the occupant may be interested in and downloads and/or provides coupons to the occupant network device (e.g., cell phone or other network device).

Figure 12:
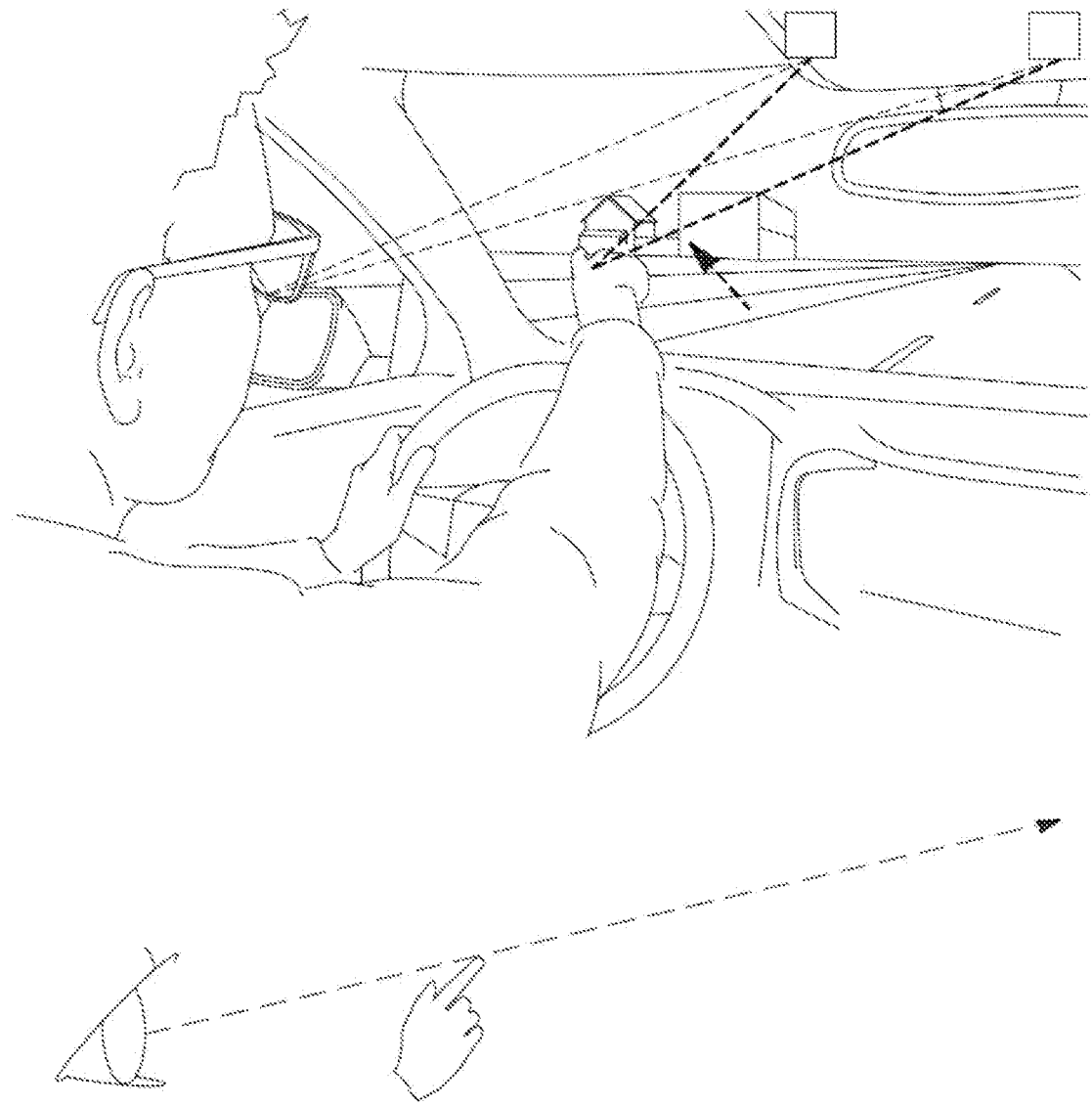
FIG. 12 is an image of an interior of a vehicle illustrating eye and finger tracking and occupant selection of an object in a field of view in accordance with the present disclosure.
Figure 13:
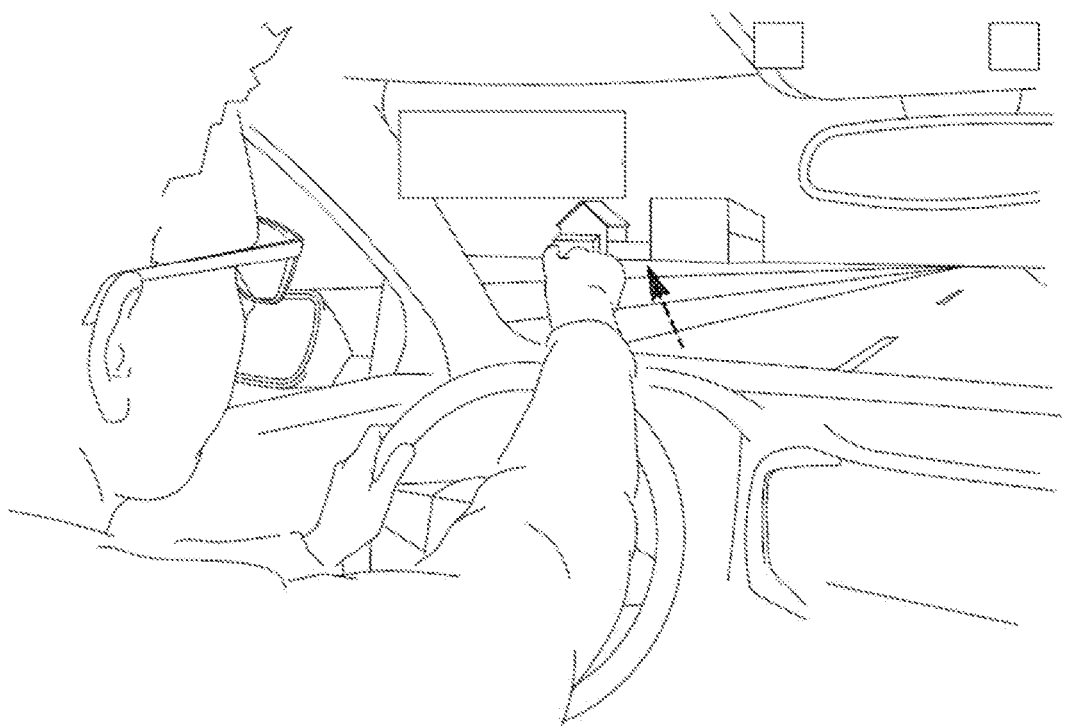
FIG. 13 is an image of an interior of a vehicle illustrating display of a text message pertaining to an object in a field of view of an occupant in accordance with the present disclosure.

The information displayed at 524 and during other operations disclosed herein may be based on gestures from an occupant, some examples of which are shown in FIGS. 12-13, voice commands, touches on a touchscreen, input via buttons, etc.

As another example, the personal information may include a shopping list, which may be uploaded to the memory 132 via one of the network devices. The infotainment module 108 may display items identifying recommended stores where the products on the shopping list are available and as stated below corresponding coupons for discounts on the products. For example, the infotainment module 108 may display a message stating "the shoes you are looking for are available at this store, buy today for additional 25% discount" or "There is a 2-for-1 sale at items at this grocery store."

In addition to a visual display, the infotainment module 108 may audibly output local information regarding buildings, businesses and/or points of interest via one or more speakers. Speakers may be used, for example, for complementary information to avoid saturating a field of view. FIG. 6 is an example view illustrating displaying interactive items in front of objects in a field of view of an occupant. The items may be icons, text and/or other selectable items. The occupant may select the items to obtain additional information which may be displayed in front of the object and/or near the object in the field of view of the occupant.

At 526 of FIG. 5B, the infotainment module 108 may determine a type of each object external to the vehicle 101 and a location of each object relative to the vehicle 101. Examples of types of objects include, for example, vehicles, pedestrians, cyclists, animals, buildings, etc. The infotainment module 108 may determine the types of the objects using an object detection algorithm. The infotainment module 108 may determine the locations of the objects, for example, based on the FOV of the cameras, the location of the object in the pixels of an image, and dimensions (e.g., pixelwise) of the object in the image. Traffic structures (e.g., buildings, roads, mountains, etc.) are identified.

At 528, the infotainment module 108 may display available channels associated with detected objects including structures, buildings, businesses, etc. For example, if a business in the field of view of the occupant is a television studio, then the one or more channels associated with that business may be displayed.

At 530, the infotainment module 108 may determine whether an input has been received from the occupant indicating selection of one of the displayed channels. If an input has been received, operation 532 may be performed and the channel may be displayed for viewing by the occupant. As an example, the occupant may select a history channel to watch. If an input has not been received, then operation 534 may be performed.

At 534, the infotainment module 108 may determine whether an indication has been received to stop displaying the entertaining information and/or content. This indication may be in the form of an input from the occupant, or from another controller and/or sensor of the vehicle indicating that the vehicle has stopped, the occupant has left the vehicle, an alert interruption has occurred and/or some other type of indication. If an indication has been received, the method may end at 548, otherwise operation 524 may be performed.

At 536, the infotainment module 108 may determine whether an input has been received to play a game, such as a trivia game. An item may be displayed for the occupant to select to start the game. The item may be an icon, a list of games to select from, a message, a question asking if the occupant would like to play a game and/or a particular game, etc. As an example, the trivia game may include the infotainment module 108 displaying questions related to one or more objects in the field of view of the occupant. Questions provided to one occupant may be different than questions asked of a different occupant. Questions provided to each occupant may be based on the objects in the field of view of that occupant, the occupant information, and/or the preferences of the occupant. If an input is received to play a game, operation 538 is performed, otherwise operation 524 may be performed. At 538, the infotainment module 108 may play the environment interactive entertainment game selected at 536.

At 540, the infotainment module 108 may determine whether a manual or automatic mode has been selected. In one embodiment, this selection is made by the occupant. If the manual mode is selected, operation 542 may be performed, which includes displaying information and/or trivia questions based on gestures and/or eye movement, which is tracked by one or more of the internal cameras 232. Gestures may include the occupant moving one or more hands and/or fingers, to select, tap on, point at, and/or otherwise indicate an answer, a response, and/or provide an input. Other types of gestures may be used. Voice responses may also be used. If the automatic mode has been selected, operation 544 may be performed, which includes displaying information and/or trivia questions based on occupant information and/or personal preferences.

At 546, the infotainment module 108 may determine whether an indication has been received to stop playing the selected game. If an indication has been received, the method may end at 548, otherwise operation 538 may be performed.

Figure 7:
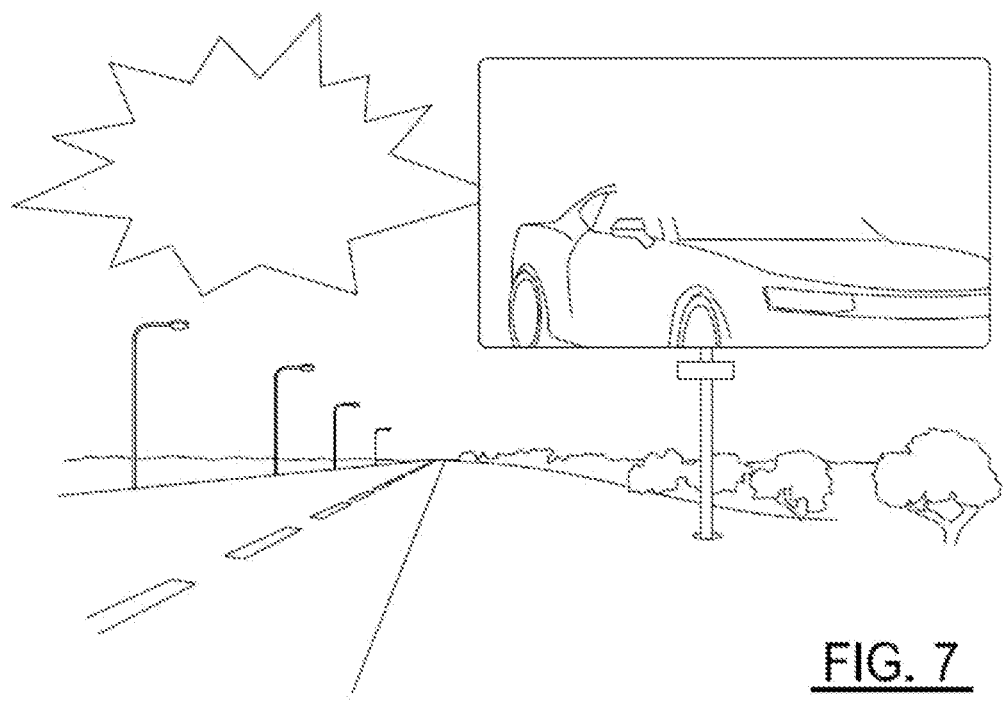
FIG. 7 is an example view illustrating display of an interactive advertisement and a corresponding discount in front of objects in a field of view of an occupant in accordance with the present disclosure.

At 550 of FIG. 5C, the infotainment module 108 may display personalized advertisements to the occupant. The infotainment module 108 may determine which advertisements to display—based on the occupant information. Different advertisements may be displayed for different occupants in the vehicle based on the information and preferences of the occupants. The infotainment module 108 may determine which advertisements to display further based on the present location of the vehicle. For example, the infotainment module 108 may display advertisements for businesses that are presently visible in front of the vehicle. Additionally or alternatively, the infotainment module 108 may display advertisements similar to and/or different than random billboards that the vehicle is passing. FIG. 7 includes an example illustration of an advertisement displayed in place of a billboard. The occupant may select the advertisement to obtain additional information regarding the advertised product and/or service. In addition to a visual display, the infotainment module 108 may audibly output information regarding advertisements via one or more speakers.

At 552 of FIG. 5C, the infotainment module 108 may display targeted coupons targeting each of the occupants and the interests and preferences of the occupants. The coupons may be displayed in relation to the displayed advertisements and/or when the occupant taps on, gestures, points at and/or otherwise selects the advertisement displayed. An example coupon in shown in FIG. 7 in association with an advertisement. The advertisement may be an advertisement on a billboard or an advertisement provided in place of a billboard. The occupant may select the coupon to have the coupon downloaded and/or to receive additional information related to the coupon. The advertisements and coupons may be obtained, for example, from one or more remote sources, examples of which are disclosed above, and/or from the memory 132. FIG. 7 shows a head up display illustrating inclusion of an advertisement and a corresponding coupon (or discount).

At 554 of FIG. 5C, the infotainment module 108 may transmit and/or download advertisements, coupons and/or other business related information to the network devices of the occupants.

At 556 of FIG. 5C, the infotainment module 108 may monitor if the vehicle stops at a place recommended by one of the advertisements. When the vehicle makes a stop at a location (e.g., a business or a point of interest) for at least a predetermined period (e.g., more than 1 minute), the infotainment module 108 may transmit advertisements and/or coupons to the network devices of the occupants.

At 558 of FIG. 5C, the infotainment module 108 may determine whether to perform a survey. If yes, operation 560 is performed, otherwise operation 566 may be performed.

At 560 of FIG. 5C, the infotainment module 108 may transmit advertisements and/or coupons to the network devices of the occupants and display one or more occupant interfaces requesting occupant input associated with a survey. Questions may be displayed to enable the occupant to rate the business (e.g., restaurant, store, etc.) at the location or point of interest. The questions may be displayed on one or more displays, windshield, and/or window as described above. An interactive, simple and quick rating system message may be displayed. An example quick rating message 561 is shown in FIG. 4. In FIG. 4 a hand 563 of an occupant is shown pointing at one of the answers, which is being selected. The infotainment module 108 via the internal cameras 232 detects this selection and stores the answer. The location may be a planned stop of a navigation route or identified based on the vehicle being stopped at the location for at least the predetermined period. At 562, a survey and/or rating questions may be displayed. The occupants may provide answers and/or rating responses via the occupant interface(s). The infotainment module 108 may remove the occupant interface at a predetermined period after the vehicle begins moving away from the location. The infotainment module 108 may determine the business or point of interest at the location based on the navigation route or in another suitable manner.

At 564 of FIG. 5C, the infotainment module 108 may store the answers and/or responses in the memory 132 and/or upload the answers and/or responses to one or more of the remote sources.

At 566, the infotainment module 108 may determine an indication has been received to stop targeted marketing. If an indication has been received, the method may end at 568, otherwise operation 550 may be performed.

The above-described method includes the infotainment module 108 determining whether to provide entertainment interactively (in response to occupant input), automatically (with or without occupant input), or to execute a game. For example, in response to occupant input, the infotainment module 108 may provide entertainment information interactively. The infotainment module 108 may, for example, output (audibly or visibly) local information to the occupant in response to receipt of occupant input regarding a location (e.g., a business or a point of interest). In an embodiment, the infotainment module 108 may provide entertainment information automatically. The infotainment module 108 may, for example, output (audibly or visibly) local information to the occupant based on locations (e.g., businesses or points of interest) located in front of the vehicle. The infotainment module 108 may audibly output information via one or more speakers and display information, for example, via one or more HUDs and/or one or more other displays.

During the above-described method, the infotainment module 108 may adjust and/or modulate the amount of information being displayed and the rate at which the information is being displayed based on vehicle speed. If the vehicle 101 is stopped, due to for example a traffic light, congested traffic, vehicle charging, etc., more information may be displayed than when traveling. The content of the information may depend on the time of day (e.g., restaurant information may be displayed during meal times). The described features may be implemented for passengers, not the driver of a conventional (non-autonomous) vehicle. In one embodiment, limited information is provided for the driver of the non-autonomous vehicle.

Figure 8:
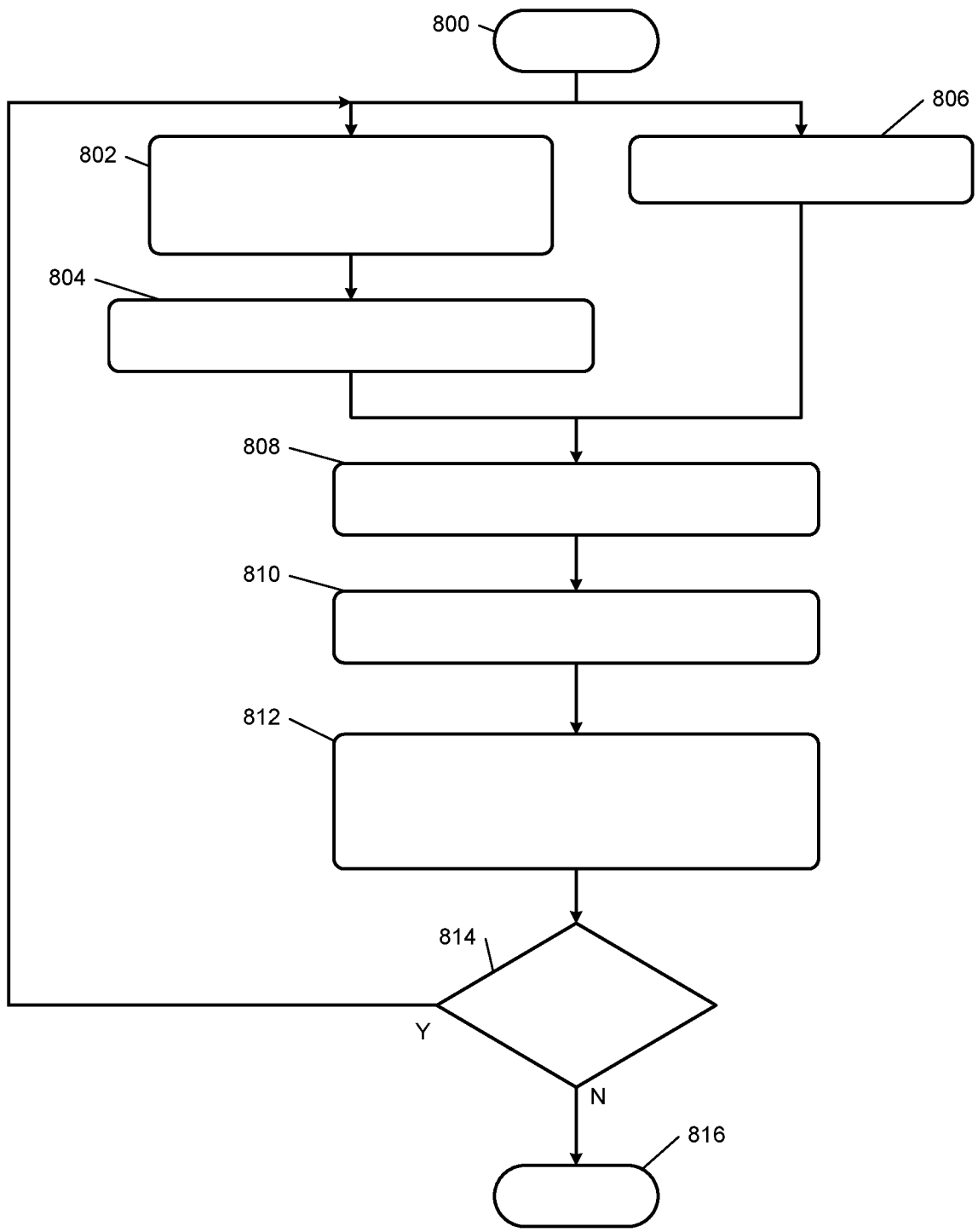
FIG. 8 illustrates an environment interactive method including eye position and finger position tracking and displaying of object related information in accordance with the present disclosure.

FIG. 8 shows an environment interactive method including eye position and finger position tracking and displaying of object related information. The method may begin at 800. At 802, the infotainment module 108 receives sensor data including data indicating eye tracking information and finger tracking information of an occupant. This may include camera data indicating positions of one or more eyes and one or more fingers of the occupant within an interior of the vehicle At 804, the infotainment module 108 determines the positions of the one or more eyes and the one or more fingers based on the data received at 802 and relative to a reference point within the interior of the vehicle. This allows the position information to be compared to environment data and aids in determining what the occupant is looking at and/or is pointing at. At 806, the infotainment module 108 receives GPS and/or map data indicating a location of the vehicle.

At 808, the infotainment module 108 coordinates the positions of the one or more eyes and/or the positions of the one or more fingers with the vehicle location information and relative to the surrounding environment. At 810, the infotainment module 108 determines the object or item being selected by the occupant based on results of the coordination performed at 808. This may be based on whether the occupant is looking at a certain location for longer than a predetermined period of time. In one embodiment, when the occupant is looking at an object for more than a predetermined period of time, then it is deemed that the occupant is intending to select the object.

At 812, the infotainment module 108 displays information for a selected object or item which may include displaying the information on a display, windshield and/or other windows. Examples of this are shown in FIGS. 6, 7, 12-15.

At 814, the infotainment module 108 determines whether to continue in the environment interactive mode. If yes, operations 802 and 806 may be performed, otherwise the method may end at 816.

Figure 9:
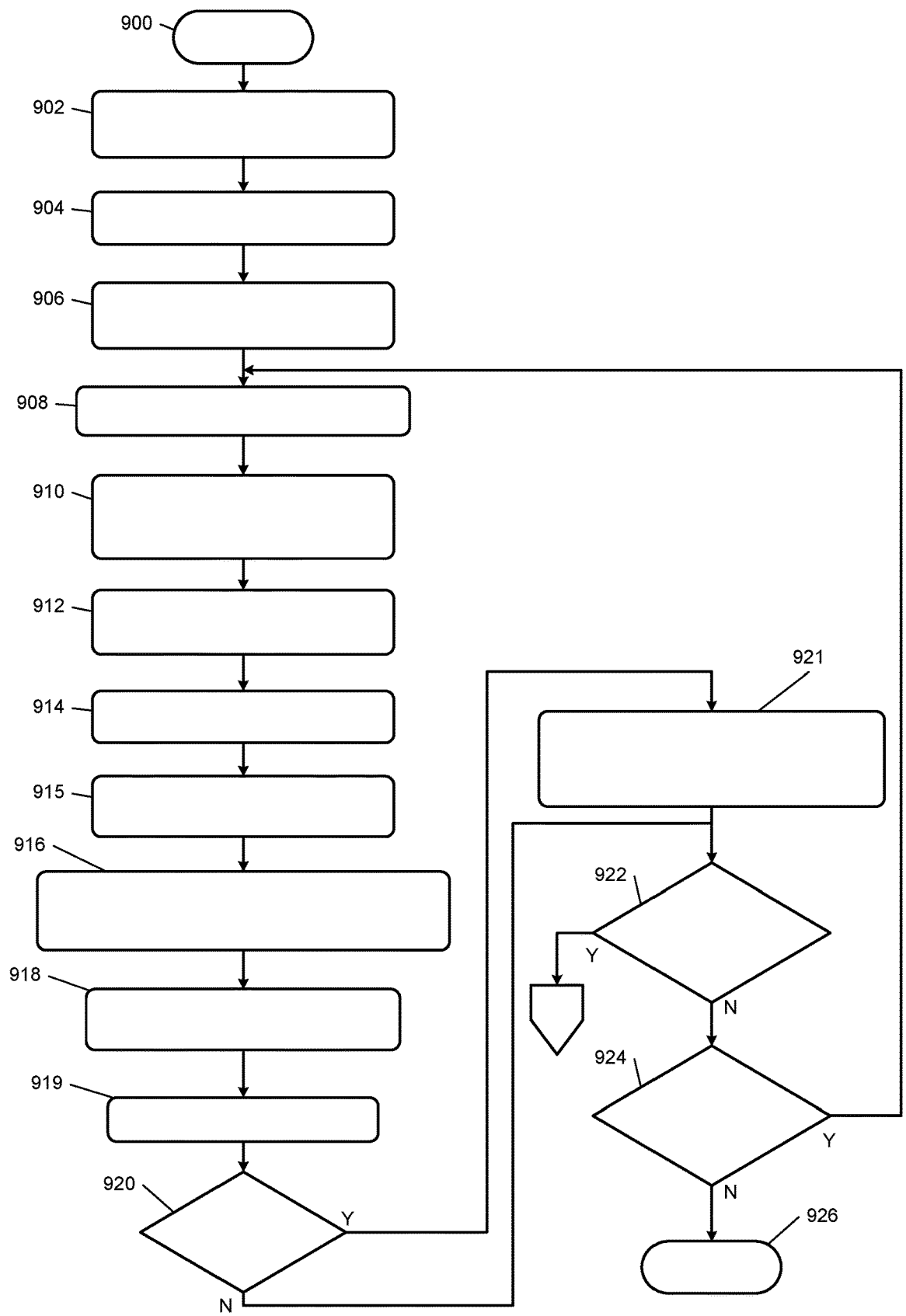
FIG. 9 illustrates a personalized environment interactive method including multi-camera eye position and finger position tracking in accordance with the present disclosure.

FIG. 9 shows a personalized environment interactive method including multi-camera eye position and finger position tracking. The method may begin at 900. At 902, the infotainment module 108 receives an indication to start the environment interactive mode. This may include the occupant providing an on/off input such as a gesture, a voice command, a touch on a touchscreen, a push of a button, etc. As another example, a gesture may be a blinking eye.

At 904, the infotainment module 108 performs a login procedure. This may include performing facial recognition, fingerprint recognition, eye recognition, and/or other personal recognition procedure to recognize the occupant. The occupant may enter and/or provide personal information and/or personal information may be automatically downloaded from a portable network device (e.g., cell phone) of the occupant when the occupant enters the vehicle. If the occupant is not recognized, the occupant may be logged in as a new user and personal information and/or preferences may be downloaded. The login procedure is performed to recognize the occupant. No credential information is needed for this process, but such information may be provided. In one embodiment, the information collected is sent to the central monitoring station 140 of FIG. 1 and the central monitoring station responds with information associated with recognizing the occupant. The central monitoring station may search the database and/or memory 146 for information pertaining to the occupant to identify the occupant and/or personal information and/or preferences of the occupant.

At 906, the infotainment module 108 determines occupant preferences based on the information collected and/or stored in association with the occupant. During the login procedure, preferences (or choices) of the occupant may be determined including, for example, tourist information, shopping mall information, grocery store information, restaurant information, etc. including corresponding likes and dislikes.

At 908, the infotainment module 108 receives captured images of the environment surrounding the vehicle and images of the inside of the vehicle. This may be done using the cameras 230, 232 of FIG. 2. In one embodiment, two or more of the internal cameras 232 are used to monitor one or more eyes and one or more fingers of the occupant. At 910, the infotainment module 108 recognizes and tracks the eyes and fingers.

At 912, the infotainment module 108 determines locations of the eyes and fingers of the occupant. The locations may be determined relative to a reference point in the vehicle. The reference point may be located anywhere in the vehicle and may refer to a fixed point in the vehicle. The infotainment module 108 may perform triangulation using data from two or more cameras to determine the locations of the eyes and fingers. At 914, the infotainment module 108 determines the geographical location of the vehicle. The location of the vehicle may be determined based on the GPS data, IMU data and/or map data. This may include determining the heading and/or orientation of the vehicle.

At 915, the infotainment module 108 may determine the objects in the field of view of the occupant. The field of view may be determined based on the locations of the eyes of the occupant, the location of the vehicle and/or the exterior captured images. This may include identifying and determining the locations of the objects.

At 916, the infotainment module 108 coordinates the locations of the eyes and fingers of the occupant with the geographical location of the vehicle and the objects in the field of view of the occupant. This may include determining the looking direction of the occupant and/or the pointing direction of the finger of the occupant to determine which objects the occupant is looking and/or pointing at.

At 918, the infotainment module 108 may determine one or more of the objects being selected by the occupant based on the locations of the eyes and the fingers of the occupant. An example of an occupant pointing at a particular building is shown in FIG. 12. The looking direction and the pointing direction of the occupant are mapped to the exterior environment and corresponding objects for target determination. As an example, this may include determining which building the occupant is looking at and/or pointing at in a series of multiple buildings. The infotainment module 108 may interpret a gesture provided by the occupant with the occupant's hand and/or other body part. The coordination may be implemented by, for example, the monitoring station 140 of FIG. 1. Collected data may be forwarded to the monitoring station 140 and the monitoring station may provide feedback to the infotainment module 108.

At 919, the infotainment module 108 may request confirmation of the selection made. This may include displaying a confirmation window, icon, or other confirmation item in the field of view of the occupant and the occupant selecting the item. At 920, the infotainment module 108 may determine whether a confirmation is received. If a confirmation is received, operation 921 may be performed, otherwise operation 922 may be performed.

At 921, the infotainment module 108 may display information for the selected one or more objects on a HUD, screen, windshield, side window(s) and/or other display. An example of information being displayed is shown in FIG. 13. FIG. 13 shows an interior of a vehicle illustrating eye and finger tracking and occupant selection of an object in a field of view.

At 922 of FIG. 9, the infotainment module 108 may determine whether the entertainment mode is activated. If yes, operation 522 of FIG. 5B may be performed, otherwise operation 924 may be performed.

At 924, the infotainment module 108 may determine whether to continue operating in the environment interactive mode. If yes, operation 908 may be performed, otherwise the method may end at 926.

Figure 10:
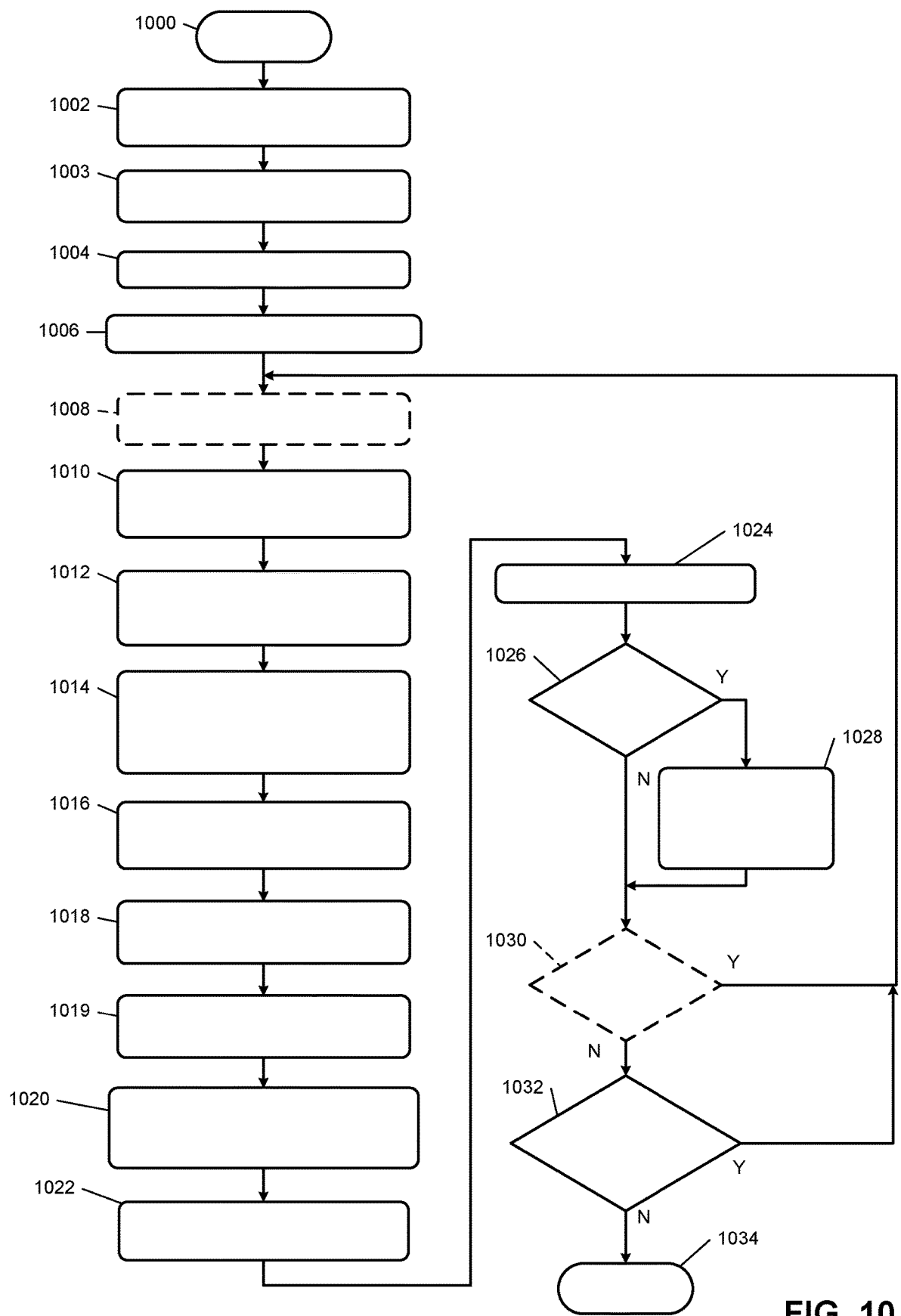
FIG. 10 illustrates another personalized environment interactive method including multi-camera eye position and finger position tracking for display of targeted marketing information in accordance with the present disclosure.

FIG. 10 shows another personalized environment interactive method including multi-camera eye position and finger position tracking for display of targeted marketing information. The method may begin at 1000. At 1002, the infotainment module 108 receives an indication to start the environment interactive mode. This may include the occupant providing an on/off input such as a gesture, a voice command, a touch on a touchscreen, a push of a button, etc.

At 1003, the infotainment module 108 may determine the geographical location of the vehicle. The location of the vehicle may be determined based on the GPS data, IMU data and/or map data. This may include determining the heading and/or orientation of the vehicle.

At 1004, the infotainment module 108 performs a login procedure similar to the above described operation 904. This procedure may be performed based on the location of the vehicle. For example, the types of personal information provided may be based on the location of the vehicle. At 1006, the infotainment module 108 determines occupant preferences based on the information collected and/or stored in association with the occupant as described above for operation 906.

At 1008, the infotainment module 108 may determine the geographical location of the vehicle if not already determined for the current iteration of operations 1008, 1010, 1012, 1014, 1016, 1018-1020, 1022, 1024, 1026, 1028, 1030, and 1032. The location of the vehicle may be determined based on the GPS data, IMU data and/or map data. This may include determining the heading and/or orientation of the vehicle.

At 1010, the infotainment module 108 may determine targeted information based on the geographical location of the vehicle, the occupant information and/or the occupant preferences. This information may be shared with and/or provided by the monitoring station 140 of FIG. 1. The targeted information may refer to information that would be of interest to the occupant.

At 1012, the infotainment module 108 may display the targeted information corresponding to the objects within the field of view of the occupant and/or nearby on a HUD, screen, windshield, side window(s) and/or other display. The infotainment module 108 may automatically display targeted information and/or provide certain information based on occupant information and preferences. As another example, the occupant information and/or preferences may indicate that the occupant likes history, museums, beaches and/or parks and provide information regarding objects and/or areas in the nearby exterior environment related to these topics, places, and/or items.

At 1014, the infotainment module 108 receives captured images of the environment surrounding the vehicle and images of the inside of the vehicle. This may be done using the cameras 230, 232 of FIG. 2. In one embodiment, two or more of the internal cameras 232 are used to monitor one or more eyes and one or more fingers of the occupant. At 1016, the infotainment module 108 recognizes and tracks the eyes and fingers of the occupant. The infotainment module 108 performs tasks involving perception to recognize eyes and fingers based on images from two or more cameras. When outputs from two interior cameras are used, this is referred to as stereo imaging. Two example interior cameras are shown in FIG. 12.

At 1018, the infotainment module 108 determines locations of the eyes and fingers of the occupant. This may be relative to a reference point in the vehicle. The reference point may be located anywhere in the vehicle and may refer to a fixed point in the vehicle. Triangulation may be performed using two or more cameras to determine the locations of the eyes and fingers.

At 1019, the infotainment module 108 may determine the objects in the field of view of the occupant based on the locations of the eyes of the occupant, the location of the vehicle and/or the exterior captured images. This may include identifying and determining the locations of the objects.

At 1020, the infotainment module 108 coordinates the locations of the eyes and fingers of the occupant with the geographical location of the vehicle and the objects in the field of view of the occupant. This may include determining the looking direction of the occupant and/or the pointing direction of the finger of the occupant to determine which objects the occupant is looking and/or pointing at.

Figure 15:
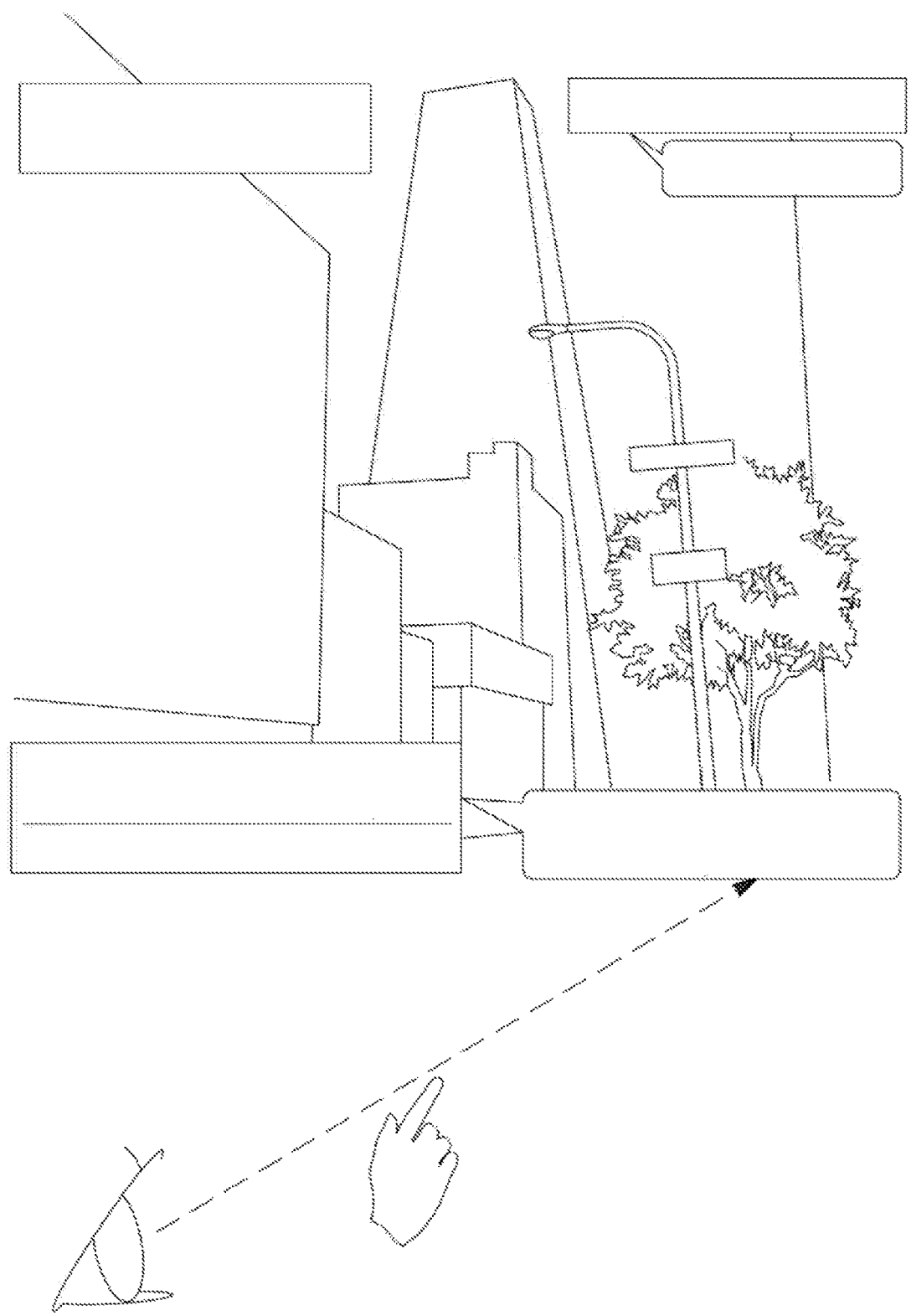
FIG. 15 is a view illustrating eye and finger tracking and selection of an item displayed in correspondence with objects in a field of view of an occupant.

At 1022, the infotainment module 108 may determine one or more of the objects being selected by the occupant based on the locations of the eyes and the fingers of the occupant. The looking direction and the pointing direction of the occupant are mapped to the exterior environment and corresponding objects for target determination. This determination may be based on known locations of a display, screen, windshield, window(s), etc. where items are displayed. This operation may be similar to operation 918. FIG. 15 shows an example of targeted information being displayed and a certain portion of the information being selected by the occupant looking and pointing at the information, which is displayed in front of the object in the field of view of the occupant.

At 1024, the infotainment module 108 may request confirmation of the selection made. This may include displaying a confirmation window, icon, or other confirmation item in the field of view of the occupant and the occupant selecting the item. At 1026, the infotainment module 108 may determine whether a confirmation is received. If a confirmation is received, operation 1028 may be performed, otherwise operation 1030 may be performed.

Figure 14:
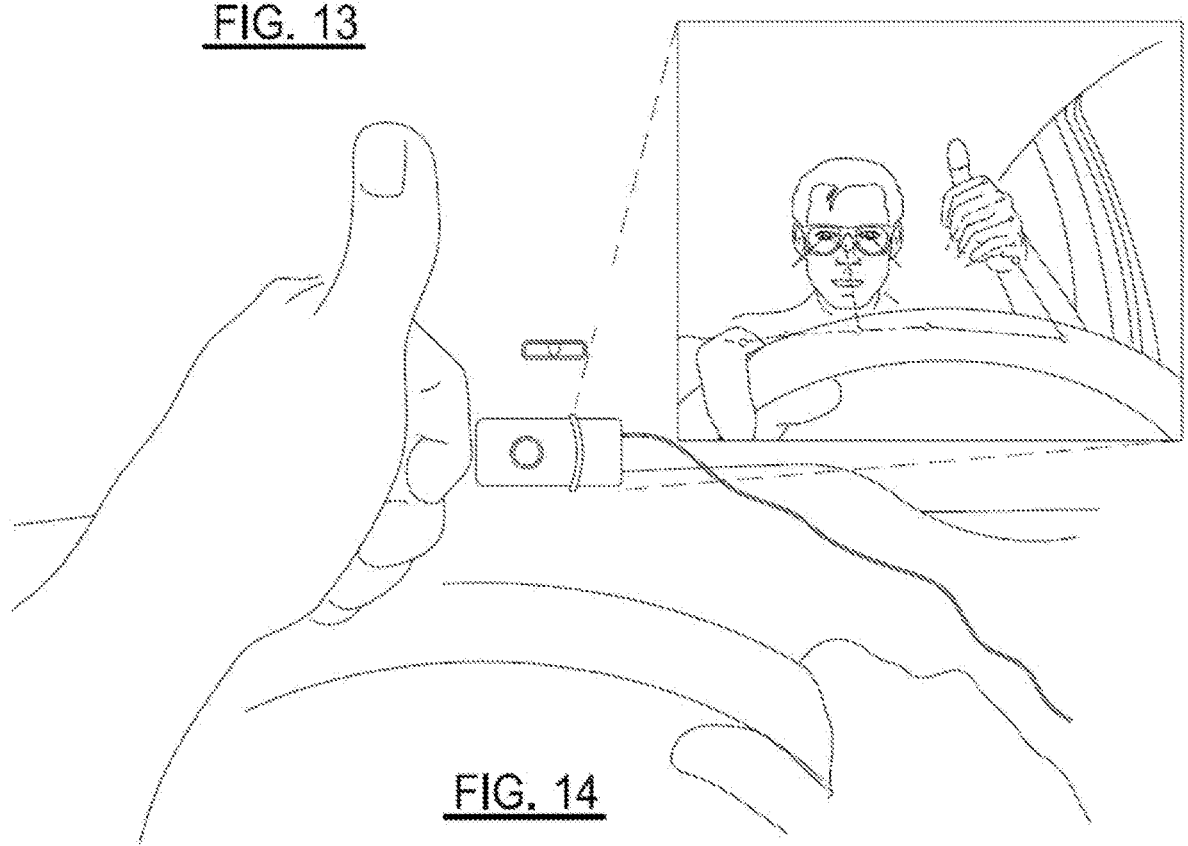
FIG. 14 is an image illustrating an occupant gesture in response to a question provided in a field of view of the occupant.

At 1028, the infotainment module 108 may display on a HUD, screen, windshield, side window(s) and/or other display a confirmation message and/or send a confirmation message to a network device associated with the occupant. In one embodiment, an email message is sent indicating a confirmed deal offered by a business and accepted by the occupant. Navigation instructions may be provided to direct the occupant and/or the vehicle to a certain location, business, etc. based on, for example, the targeted information and/or other related information selected by the occupant. The navigation instructions may be displayed on the HUD, screen, windshield, side window(s) and/or other display. In another embodiment, a confirmation message of a destination is shown and the occupant confirms the destination with a gesture, as shown in FIG. 14. In this example, the gesture is a "thumbs up" gesture. The occupant may also reject or defer sending the vehicle to a particular destination with one or more other gestures and/or inputs.

At 1030, the infotainment module 108 may determine whether an offer has been received. If yes, operation 1008 is performed, otherwise operation 1032 is performed. At 1032, the infotainment module 108 may determine whether to continue operating in the environment interactive mode. If yes, operation 1008 is performed, otherwise the method may end at 1034.

Figure 11:
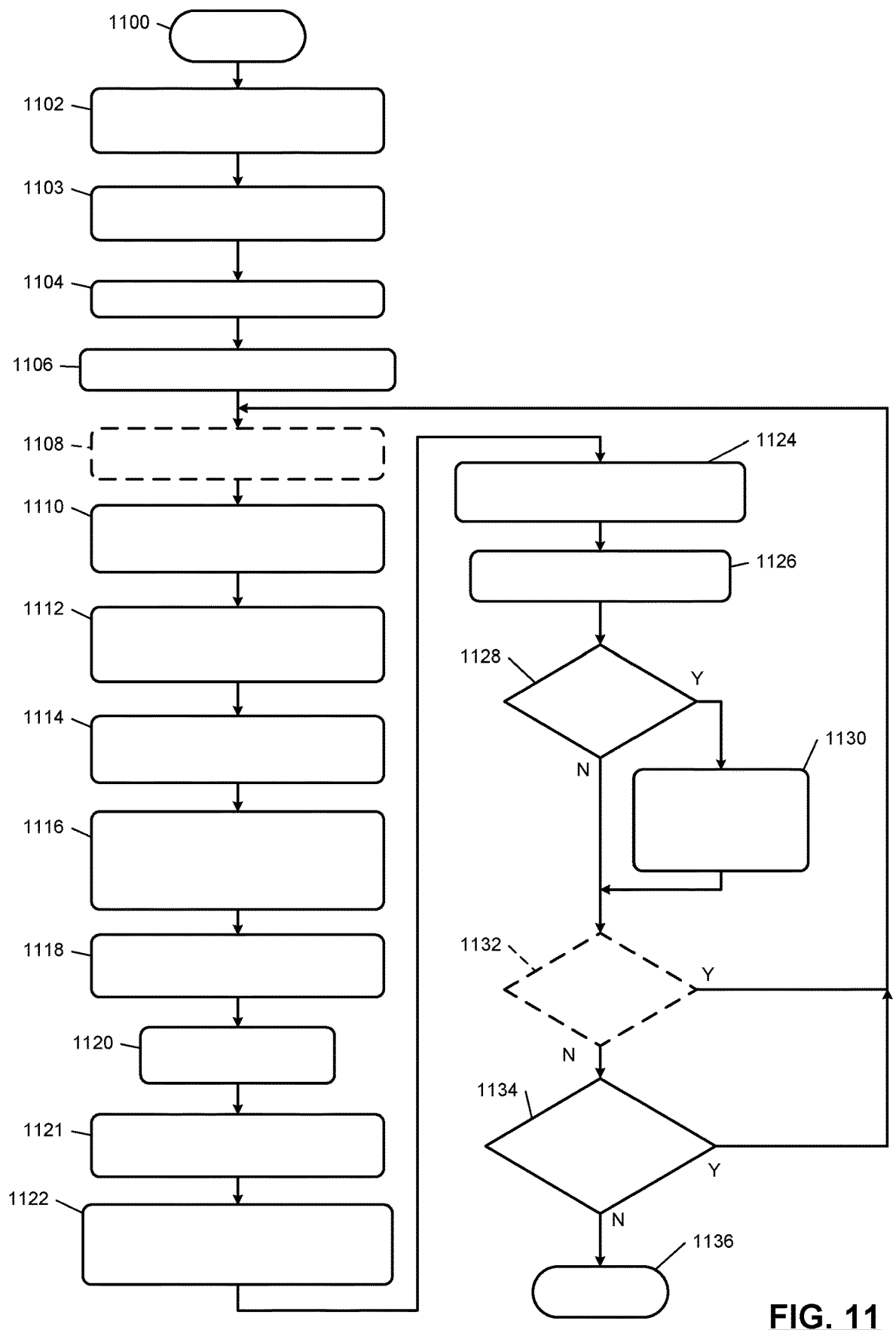
FIG. 11 illustrates another personalized environment interactive method including one or more cameras for monitoring a gaze point and finger position for display of targeted marketing information in accordance with the present disclosure.

FIG. 11 shows another personalized environment interactive method including one or more cameras for monitoring the occupant gaze point and finger position for display of targeted marketing information. The method may begin at 1100. At 1102, the infotainment module 108 receives an indication to start the environment interactive mode. This may include the occupant providing an on/off input such as a gesture, a voice command, a touch on a touchscreen, a push of a button, etc.

At 1103, the infotainment module 108 may determine the geographical location of the vehicle. The location of the vehicle may be determined based on the GPS data, IMU data and/or map data. This may include determining the heading and/or orientation of the vehicle.

At 1104, the infotainment module 108 performs a login procedure similar to operation 904 above described. This procedure may be performed based on the location of the vehicle. For example, the types of personal information provided may be based on the location of the vehicle. At 1106, the infotainment module 108 determines occupant preferences based on the information collected and/or stored in association with the occupant as described above for operation 906.

At 1108, the infotainment module 108 may determine the geographical location of the vehicle if not already determined for the current iteration of operations 1108, 1110, 1112, 1114, 1116, 1118, 1120-1122, 1124, 1126, 1128, 1130, 1132 and 1134. The location of the vehicle may be determined based on the GPS data, IMU data and/or map data.

At 1110, the infotainment module 108 may determine targeted information based on the geographical location of the vehicle, the occupant information and/or the occupant preferences. This information may be shared with and/or provided by the monitoring station 140 of FIG. 1. The targeted information may refer to information that would be of interest to the occupant.

At 1112, the infotainment module 108 may display the targeted information corresponding to the objects within the field of view of the occupant and/or nearby on a HUD, screen, windshield, side window(s) and/or other display. The infotainment module 108 may automatically display targeted information and/or provide certain information based on occupant information and preferences. As another example, the occupant information and/or preferences may indicate that the occupant likes history, museums, beaches and/or parks and provide information regarding objects and/or areas in the nearby exterior environment related to these topics, places, and/or items.

At 1114, the infotainment module 108 creates a pattern of near-infrared light on one or more eyes of the occupant. One of the IR light sources 236 shines IR light at one or more eyes of the occupant and one of the internal cameras 232 captures images of the one or more eyes at 1116 based on IR light reflected off of the one or more eyes. In one embodiment, only a single interior camera is used to capture these images of the occupant. At 1116, the infotainment module 108 receives captured images of the environment surrounding the vehicle and images of the inside of the vehicle. This may be done using the cameras 230, 232 of FIG. 2.

At 1118, the infotainment module 108 determines a position and a gaze point of each eye being monitored. In one embodiment, the irises of the eyes are tracked using an iris tracking algorithm.

At 1120, the infotainment module 108 determines positions of the fingers of the occupant based on images from the same single camera used to track the eyes or based on images from another camera. In one embodiment, a first camera is designated for tracking eyes and another camera is dedicated for tracking fingers.

At 1121, the infotainment module 108 may determine the objects in the field of view of the occupant based on the locations of the eyes and/or the looking direction of the irises of the eyes of the occupant, the location of the vehicle and/or the exterior captured images. This may include identifying and determining the locations of the objects.

At 1122, the infotainment module 108 coordinates the locations of the eyes and fingers of the occupant with the geographical location of the vehicle and the objects in the field of view of the occupant. This may include determining the looking direction of the occupant and/or the pointing direction of the finger of the occupant. To determine which objects the occupant is looking and/or pointing at.

At 1124, the infotainment module 108 may determine one or more of the objects being selected by the occupant based on the locations of the eyes, the looking direction of the irises, and the fingers of the occupant. The looking direction and the pointing direction of the occupant are mapped to the exterior environment and corresponding objects for target determination. This determination may be based on known locations of a display, screen, windshield, window, etc. where items are displayed. This operation may be similar to operation 918.

At 1126, the infotainment module 108 may request confirmation of the selection made. This may include displaying a confirmation window, icon, or other confirmation item in the field of view of the occupant and the occupant selecting the item. At 1128, the infotainment module 108 may determine whether a confirmation is received. The infotainment module 108 may interpret the gesture (e.g., hand gesture) or voice response provided by the occupant to confirm whether the IR based eye tracking on the gaze point of the occupant for selecting (i) a target outside the vehicle, or (ii) information or item displayed in the field of view and/or on a HUD, screen, windshield, side window(s) and/or other display is accurate. If a confirmation is received, operation 1130 may be performed, otherwise operation 1132 may be performed.

At 1130, the infotainment module 108 may display on a HUD, screen, windshield, side window(s) and/or other display a confirmation message and/or send a confirmation message to a network device associated with the occupant. In one embodiment, an email message is sent indicating a confirmed deal offered by a business and accepted by the occupant. Navigation instructions may be provided to direct the occupant and/or the vehicle to a certain location, business, etc. based on, for example, the targeted information and/or other related information selected by the occupant. The navigation instructions may be displayed on the HUD, screen, windshield, side window(s) and/or other display. In another embodiment, a confirmation message of a destination is shown and the occupant confirms the destination with a gesture, as shown in FIG. 14.

At 1132, the infotainment module 108 may determine whether an offer has been received. If yes, operation 1108 is performed, otherwise operation 1134 is performed. At 1134, the infotainment module 108 may determine whether to continue operating in the environment interactive mode. If yes, operation 1108 is performed, otherwise the method may end at 1136.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in a different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, occupant applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An environment interactive system for a vehicle, the environment interactive system comprising:
   a first camera configured to capture first images of an area external to the vehicle;
   a second camera configured to capture second images of an area interior to the vehicle;
   a telematics control module configured to determine a geographical location of the vehicle;
   a viewing device configured to display items (i) at least one of adjacent to, on or in front of detected objects, which are external to the vehicle, and (ii) in a field of view of an occupant, wherein the items include information corresponding to the detected objects; and
   an infotainment module configured to
      detect the objects based on the first images and the geographical location of the vehicle,
      based on the second images, track at least one of a location of an eye of the occupant or a location of a body part of the occupant other than the eye,
      based on the location of the eye and the location of the body part, display the items via the viewing device in the field of view of the occupant,
      receive information and preferences of the occupant,
      display an item for the occupant to select on the viewing device corresponding to starting a game, and
      based on the location of the eye and the location of the body part, start the game.

2. The environment interactive system of claim 1, further comprising a third camera configured to capture third images of an interior of the vehicle,
   wherein the infotainment module is configured to, based on the second images and the third images, track the at least one of the location of the eye of the occupant or the body part of the occupant.

3. The environment interactive system of claim 1, wherein:
   the infotainment module is configured to determine a gaze point of the eye of the occupant; and
   based on the location of the gaze point and the location of the body part, display the items via the viewing device in the field of view of the occupant.

4. The environment interactive system of claim 1, the infotainment module is configured to, based on at least one of the location of the eye or the location of the body part, display the items in front of the objects and in the field of view of the occupant.

5. The environment interactive system of claim 1, wherein the infotainment module is configured to:
   receive information and preferences of the occupant; and
   based on the information and preferences, display information about certain ones of the objects in the field of view of the occupant.

6. The environment interactive system of claim 1, wherein the infotainment module is configured to:
   receive information and preferences of the occupant; and
   based on the information and preferences, display at least one of website pages or applications related to certain ones of the objects in the field of view of the occupant.

7. The environment interactive system of claim 1, wherein the infotainment module is configured to:
   receive information and preferences of the occupant; and
   based on the information and preferences, display at least one of targeted advertisements or coupons related to certain ones of the objects in the field of view of the occupant.

8. The environment interactive system of claim 1, wherein the game includes displaying questions in the field of view of the occupant for the occupant to read and answer.

9. The environment interactive system of claim 1, wherein the infotainment module is configured to:
   determine if the vehicle has stopped at a recommended location of a business; and
   display in the field of view of the occupant a survey question for the occupant to answer pertaining to the business.

10. The environment interactive system of claim 1, wherein the infotainment module is configured to:

detect when the occupant selects one of the objects by gesturing at the selected one of the objects; and display information pertaining to the selected one of the objects.

11. The environment interactive system of claim 1, wherein the infotainment module is configured to:

display information on a head up display pertaining to one of the objects; and based on the at least one of the location of the eye or the location of the body part, detect when the occupant selects the one of the objects.

12. The environment interactive system of claim 1, wherein the infotainment module is configured to:

interpret a gesture made by the occupant with regards to at least one of one of the objects or one of the items; and perform an action in response to the gesture including enabling selection of at least one of the items or the objects.

13. The environment interactive system of claim 1, wherein the infotainment module is configured to interpret a gesture or voice response provided by the occupant to confirm whether eye tracking of a gaze point of the occupant is accurate.

14. The environment interactive system of claim 1, wherein the game is an environment interactive game played in an augmented reality.

15. The environment interactive system of claim 1, wherein the game includes displaying trivia questions, via the viewing device, related to at least one of an environment external to the vehicle and an object in the environment external to the vehicle.

16. The environment interactive system of claim 15, wherein the game includes feedback regarding answers to the trivia questions via at least one of an audible device and a haptic device.

17. An environment interactive method for an occupant of a vehicle, the environment interactive method comprising:

capturing first images of an area external to the vehicle;

capturing second images of an area interior to the vehicle;

determining a geographical location of the vehicle;

displaying items (i) between detected objects and the occupant, and (ii) in a field of view of the occupant, wherein the items correspond to the detected objects;

detecting the objects based on the first images and the geographical location of the vehicle;

based on the second images, tracking a location of an eye of the occupant and a location of a body part of the occupant other than the eye;

based on the location of the eye and the location of the body part, displaying the items via a viewing device in the field of view of the occupant, wherein the viewing device is configured, based on user preferences, to display targeted information for one or more businesses at one or more locations;

detecting a first one or more gestures by the occupant for selection of one of the one or more locations;

based on a second one or more gestures from the occupant, display via the viewing device or another display device navigation instructions to the selected one of the one or more locations, the navigation instructions being provided in an augmented reality such that the navigation instructions are provided in the field of view of the occupant and include directions for driving the vehicle to the selected one of the one or more locations, the field of view including an environment external to the vehicle; and at least one
  i) display an item for the occupant to select on the viewing device corresponding to starting a game and, based on the location of the eye and the location of the body part, start the game, and
  ii) determine a business where the vehicle is stopped and take a survey of the occupant via the viewing device for the business where the vehicle is stopped.

18. The method of claim 17, further comprising:

tracking an iris of the eye of the occupant; and based on the location of the iris and the location of the body part, displaying the items via the viewing device in the field of view of the occupant.

19. The method of claim 17, further comprising:

receiving information and preferences of the occupant; and based on the information and preferences,
  displaying information about certain ones of the objects in the field of view of the occupant,
  displaying targeted advertisements related to certain ones of the objects in the field of view of the occupant, and
  displaying targeted coupons related to certain ones of the objects in the field of view of the occupant.

20. An environment interactive system for a vehicle, the environment interactive system comprising:

a first camera configured to capture first images of an area external to the vehicle;

a second camera configured to capture second images of an area interior to the vehicle;

a telematics control module configured to determine a geographical location of the vehicle;

a viewing device configured to display items (i) at least one of adjacent to, on or in front of detected objects, which are external to the vehicle, and (ii) in a field of view of an occupant, wherein the items include information corresponding to the detected objects; and an infotainment module configured to
  detect the objects based on the first images and the geographical location of the vehicle,
  based on the second images, track at least one of a location of an eye of the occupant or a location of a body part of the occupant other than the eye,
  based on the location of the eye and the location of the body part, display the items via the viewing device in the field of view of the occupant,
  determine a business where the vehicle is stopped, and
  take a survey of the occupant via the viewing device for the business where the vehicle is stopped.

* * * * *